June 24, 1924.
W. RYDER ET AL
1,498,981
WRAPPING AND TYING MACHINE
Filed Feb. 3, 1922
25 Sheets—Sheet 20
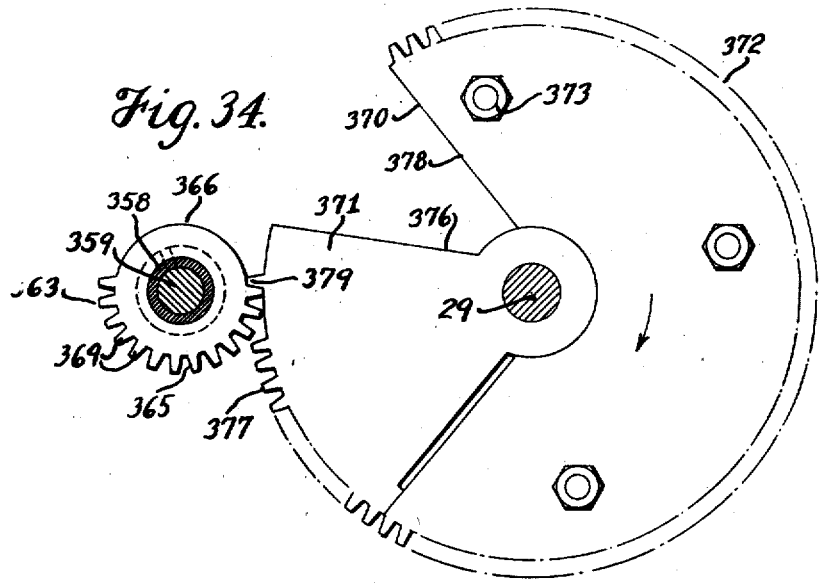
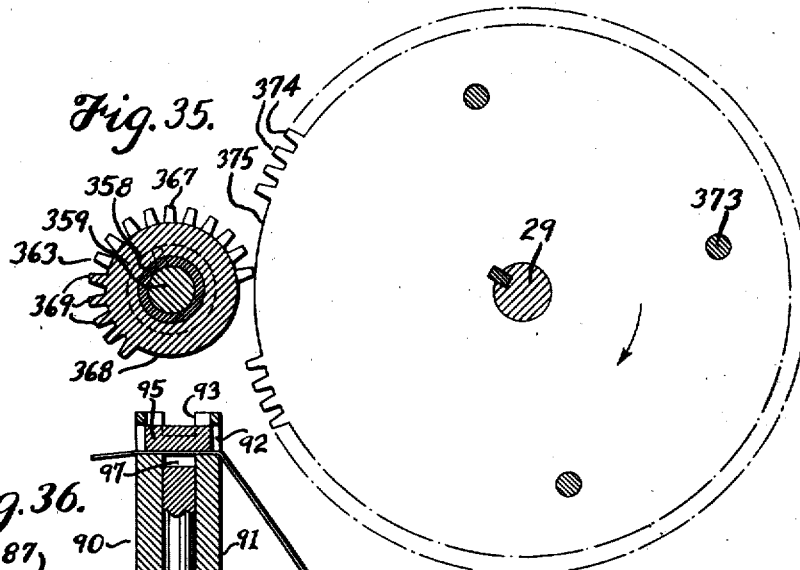
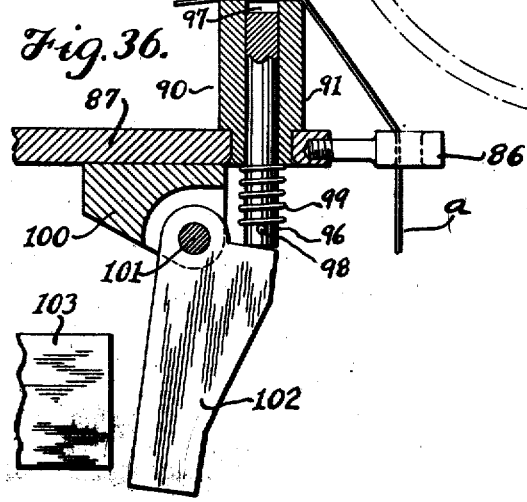
INVENTORS
William Ryder
Edward Ryder
BY
Henry Darby & McKee
ATTORNEYS

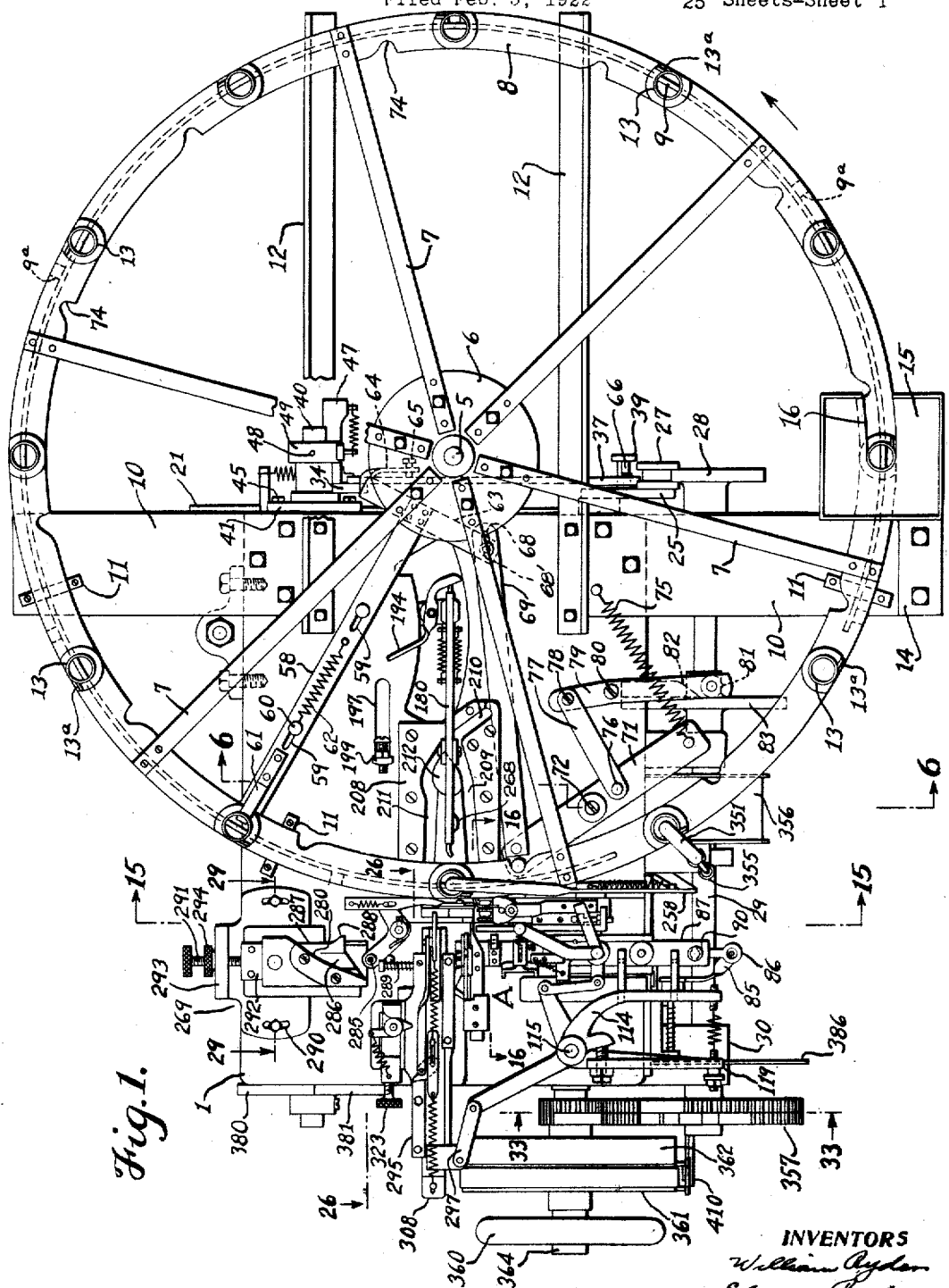

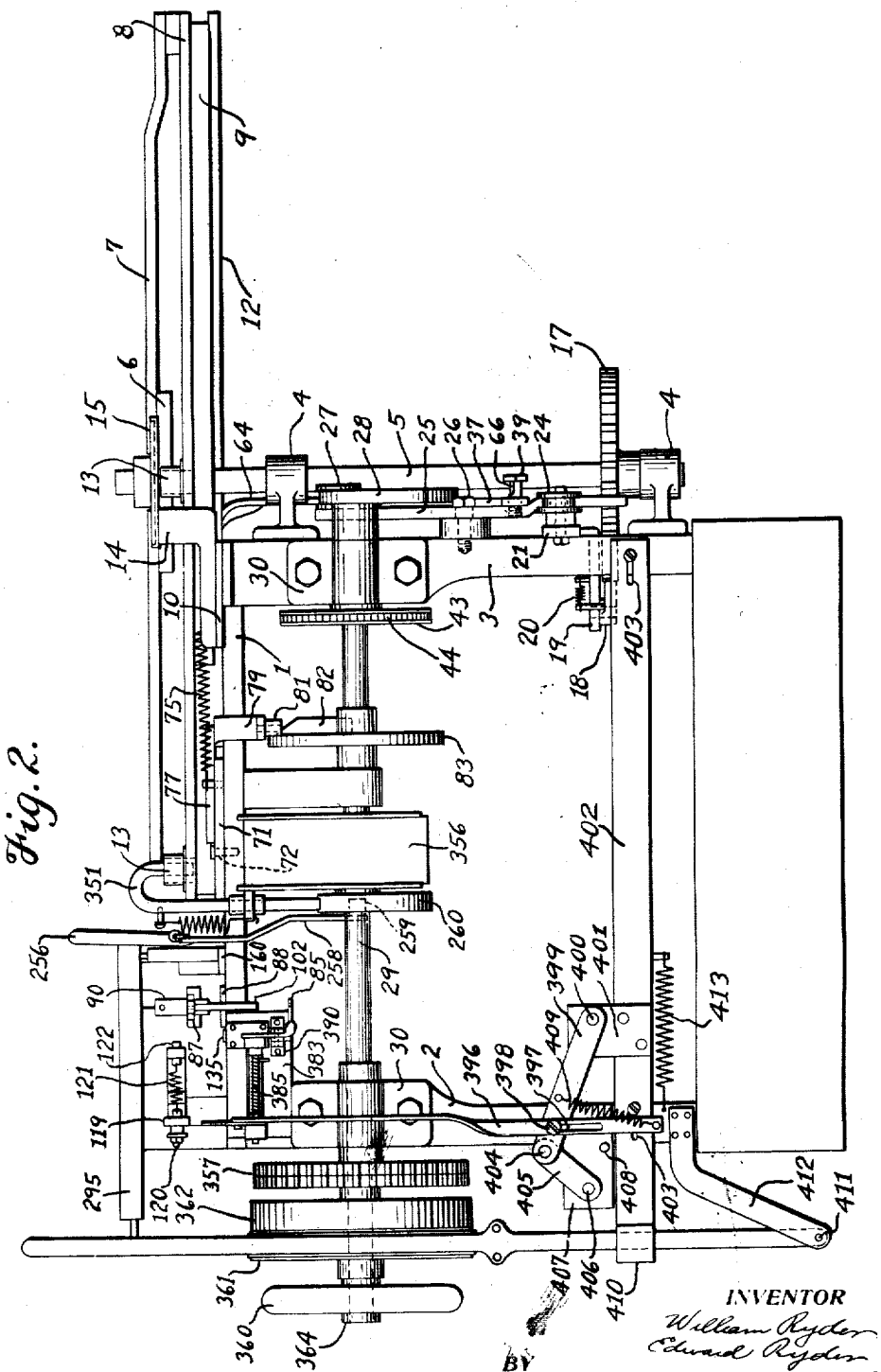

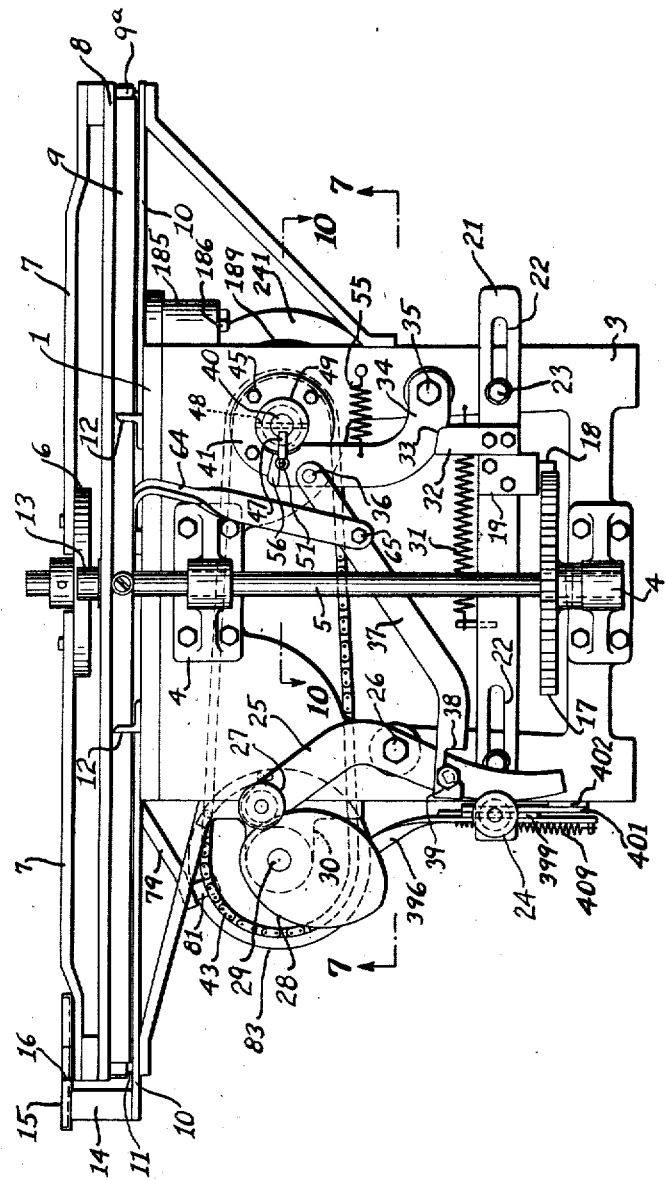

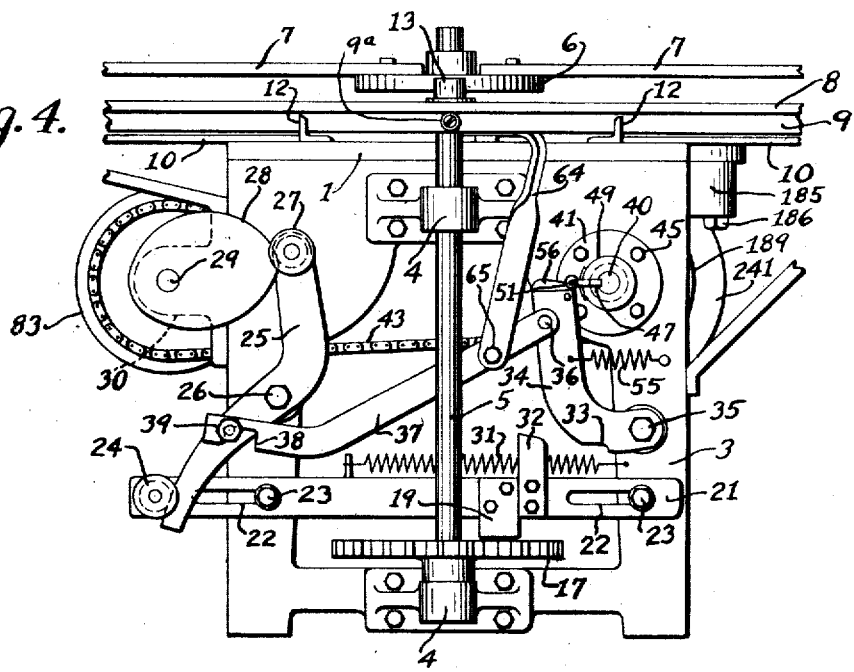
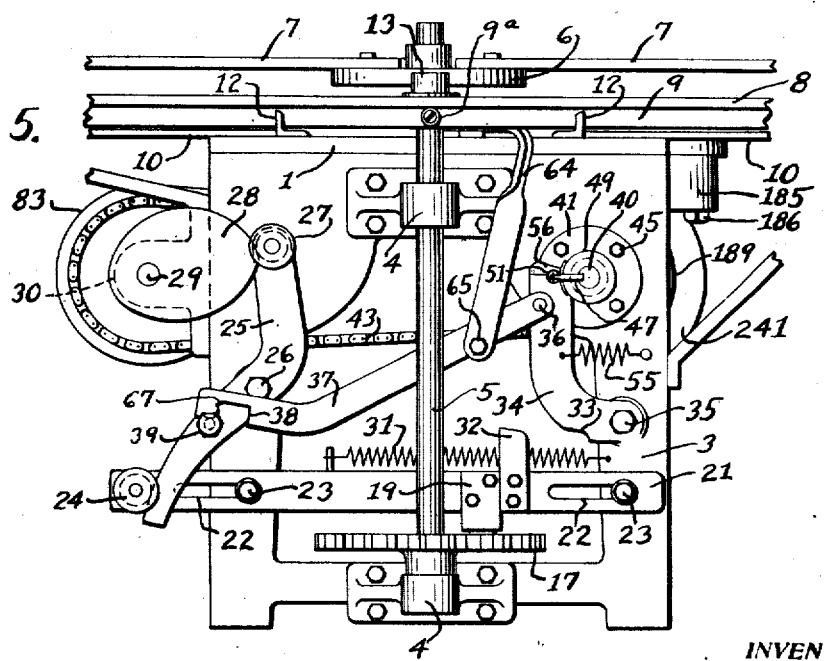

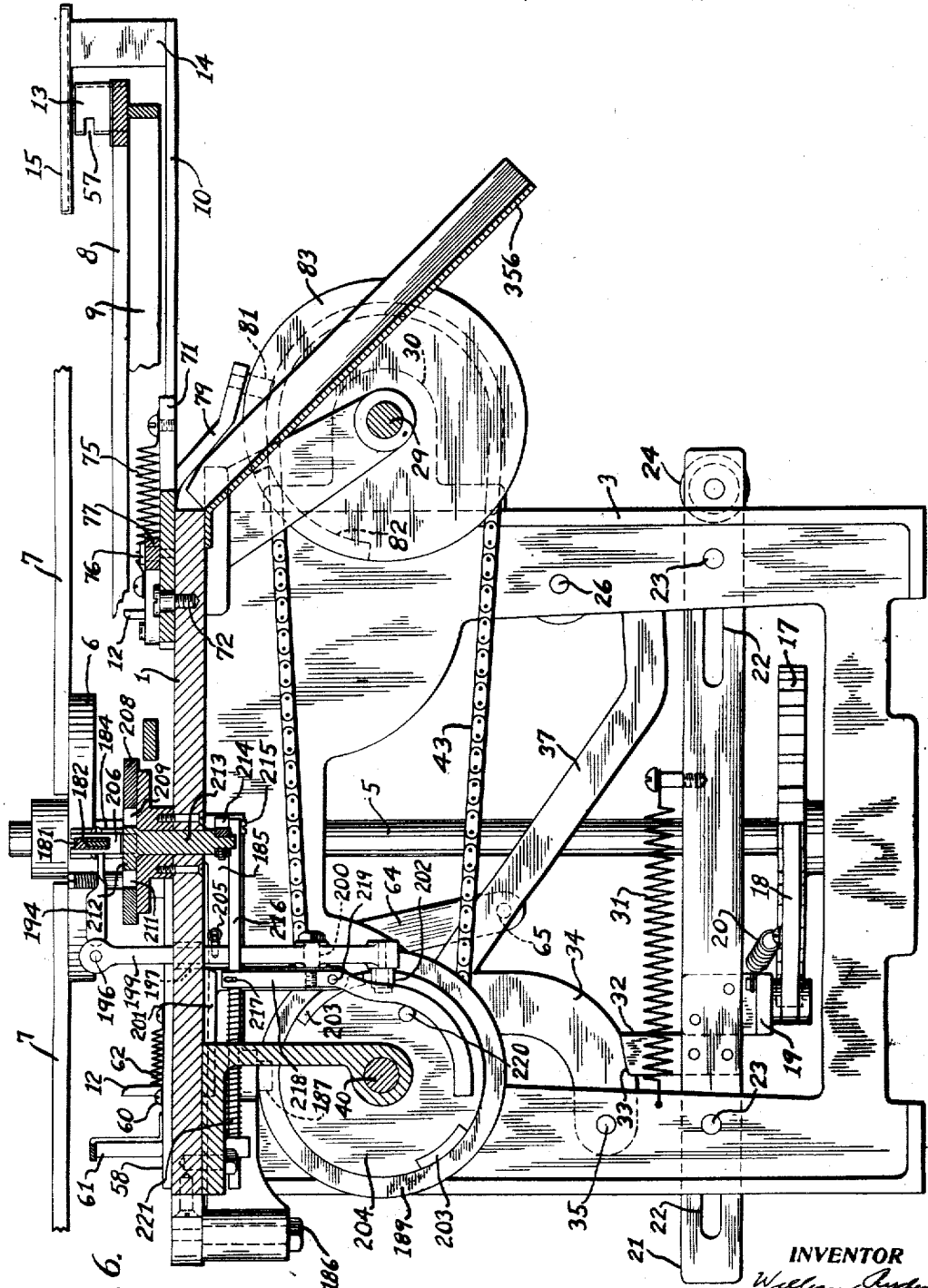

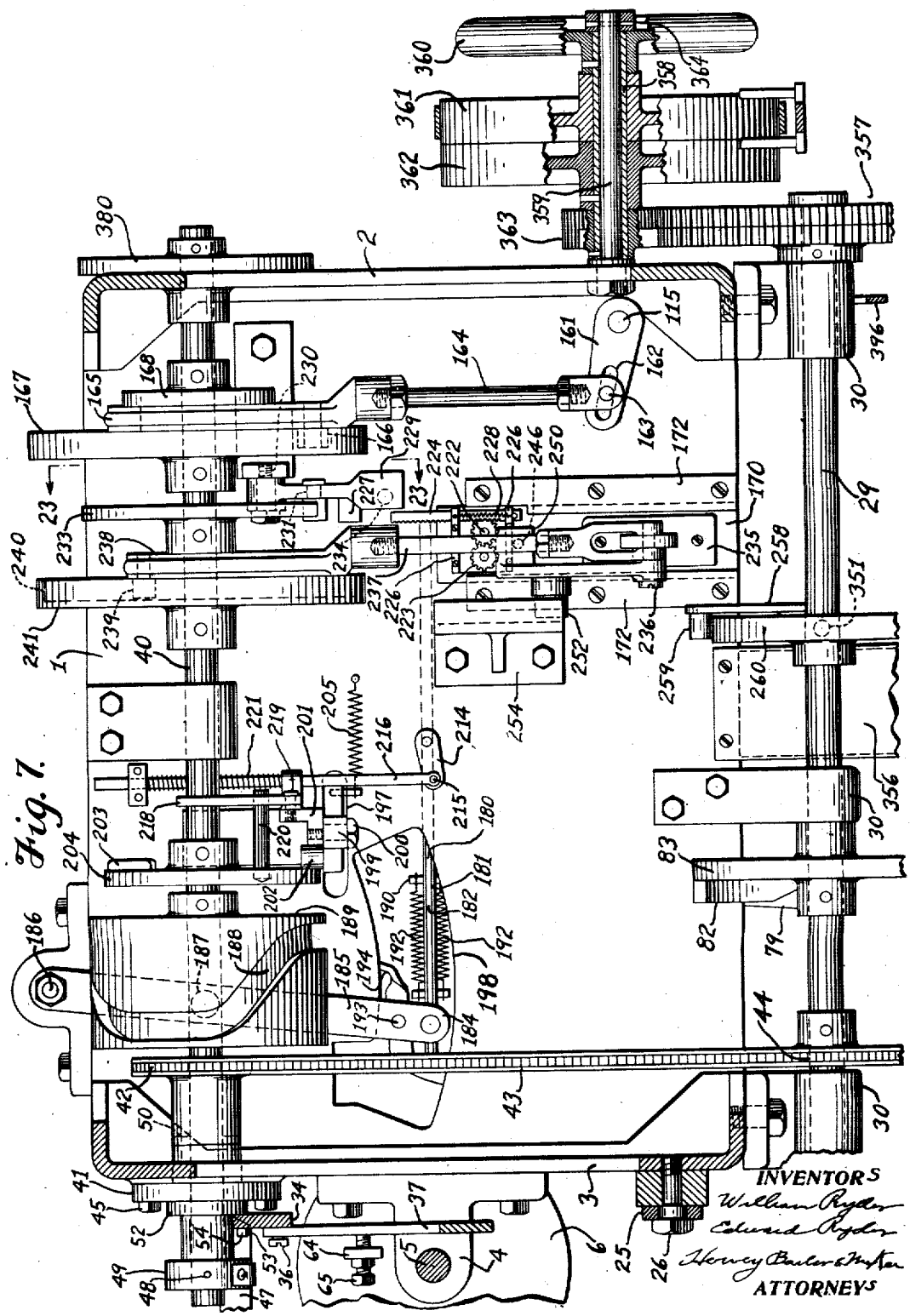

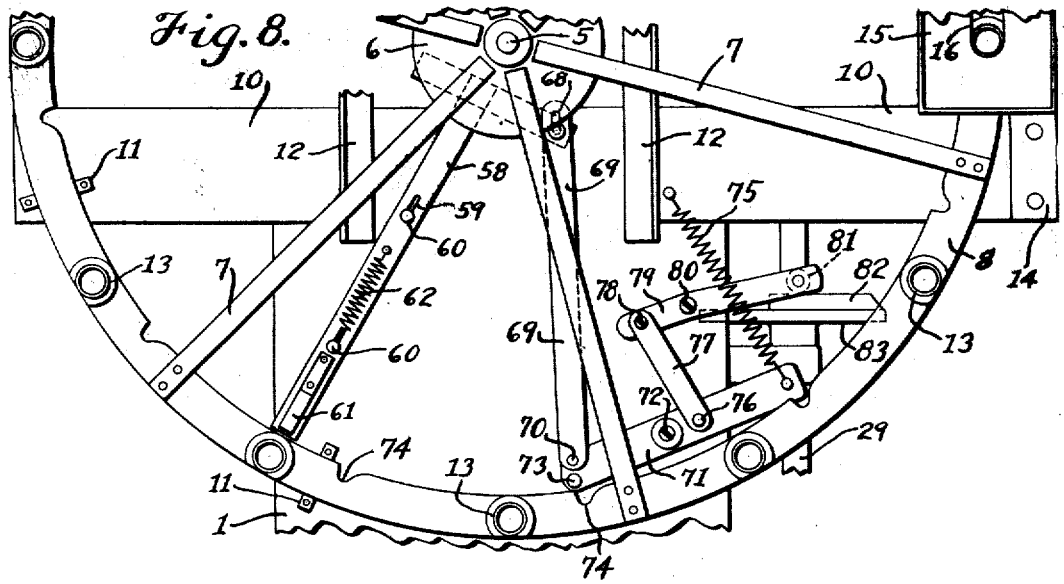

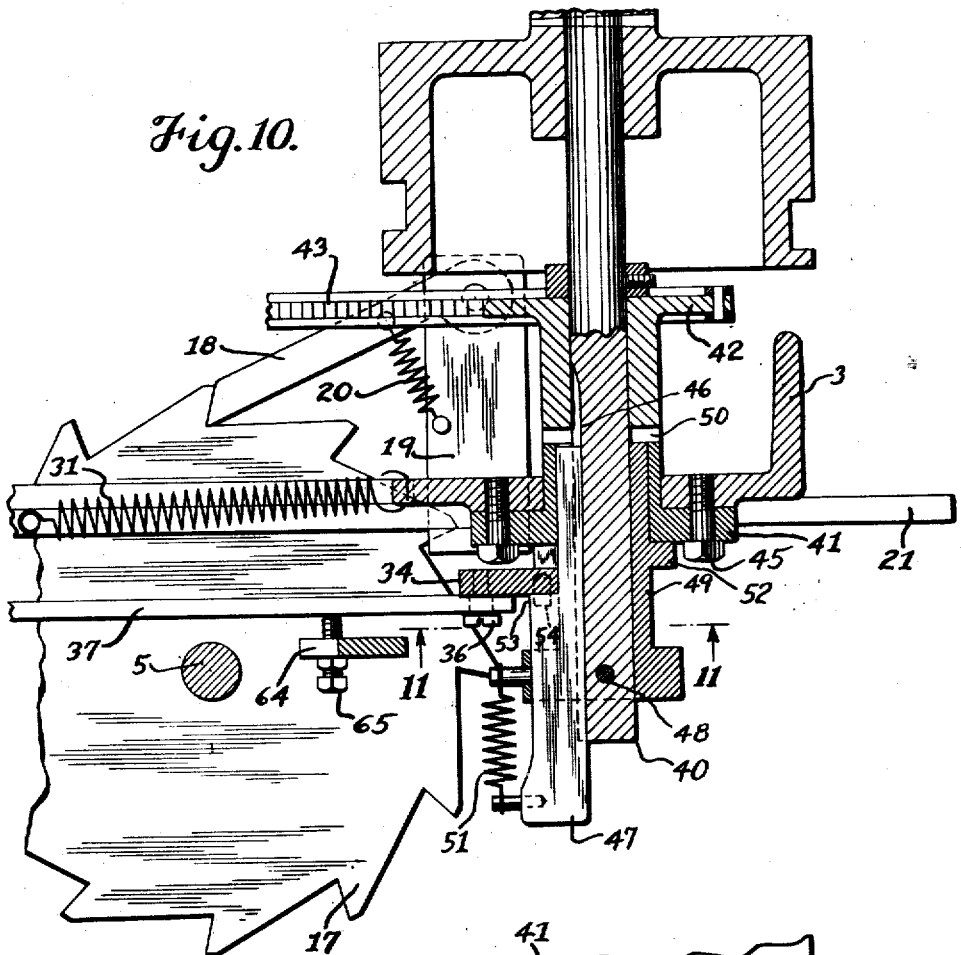
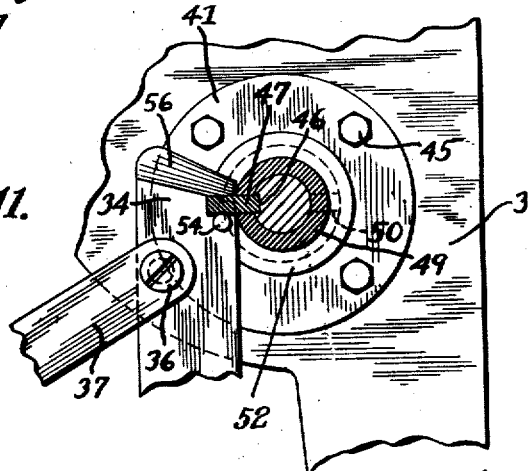

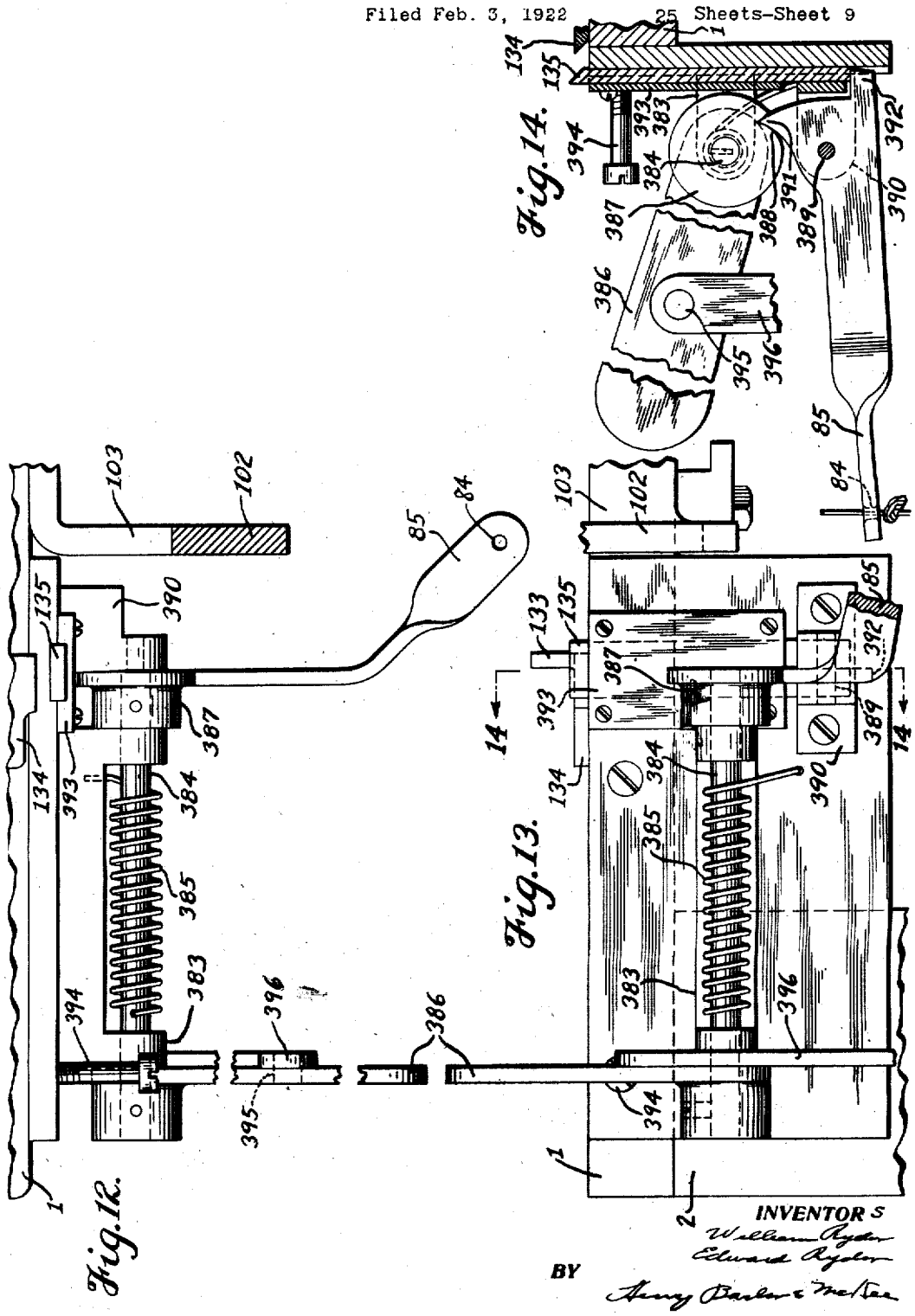

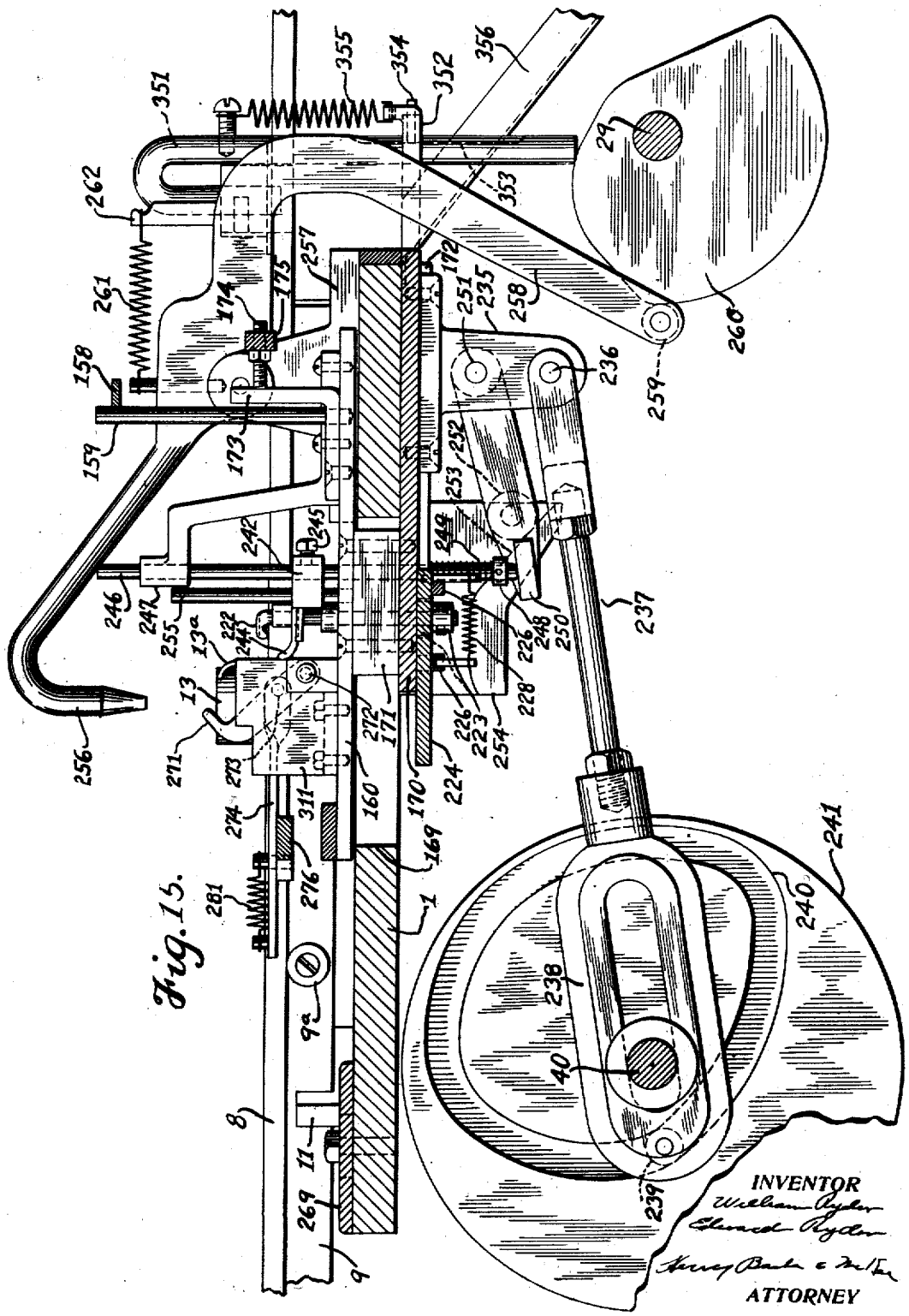

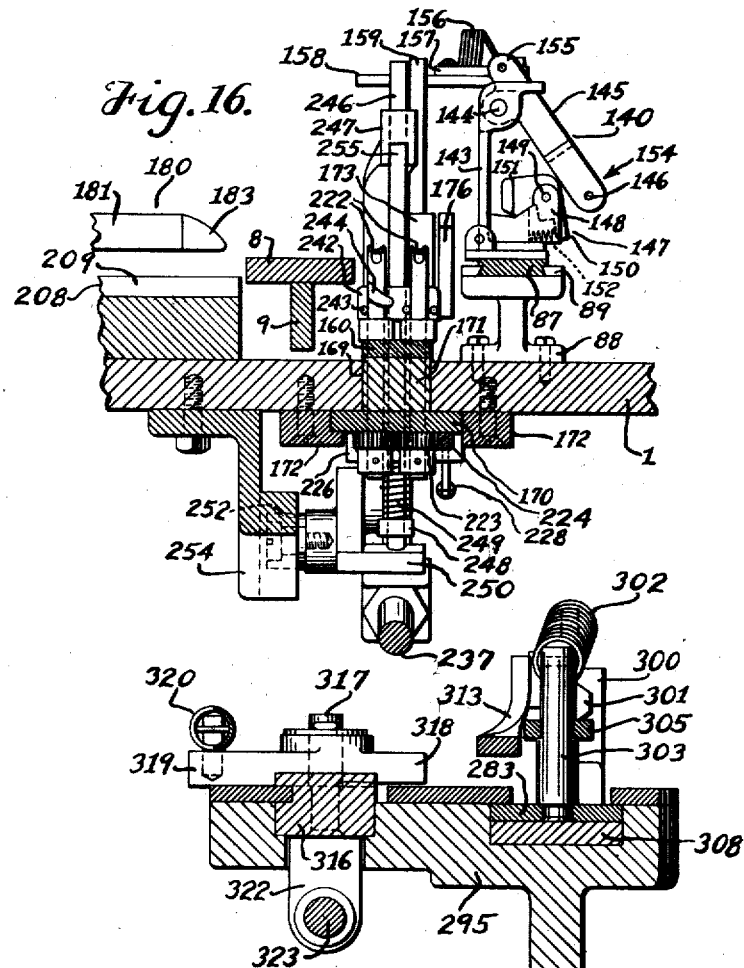
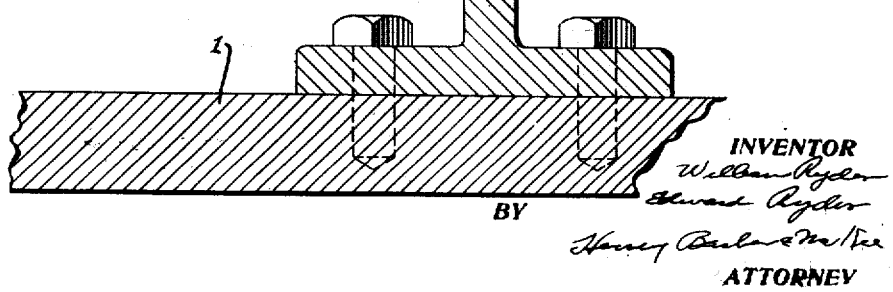

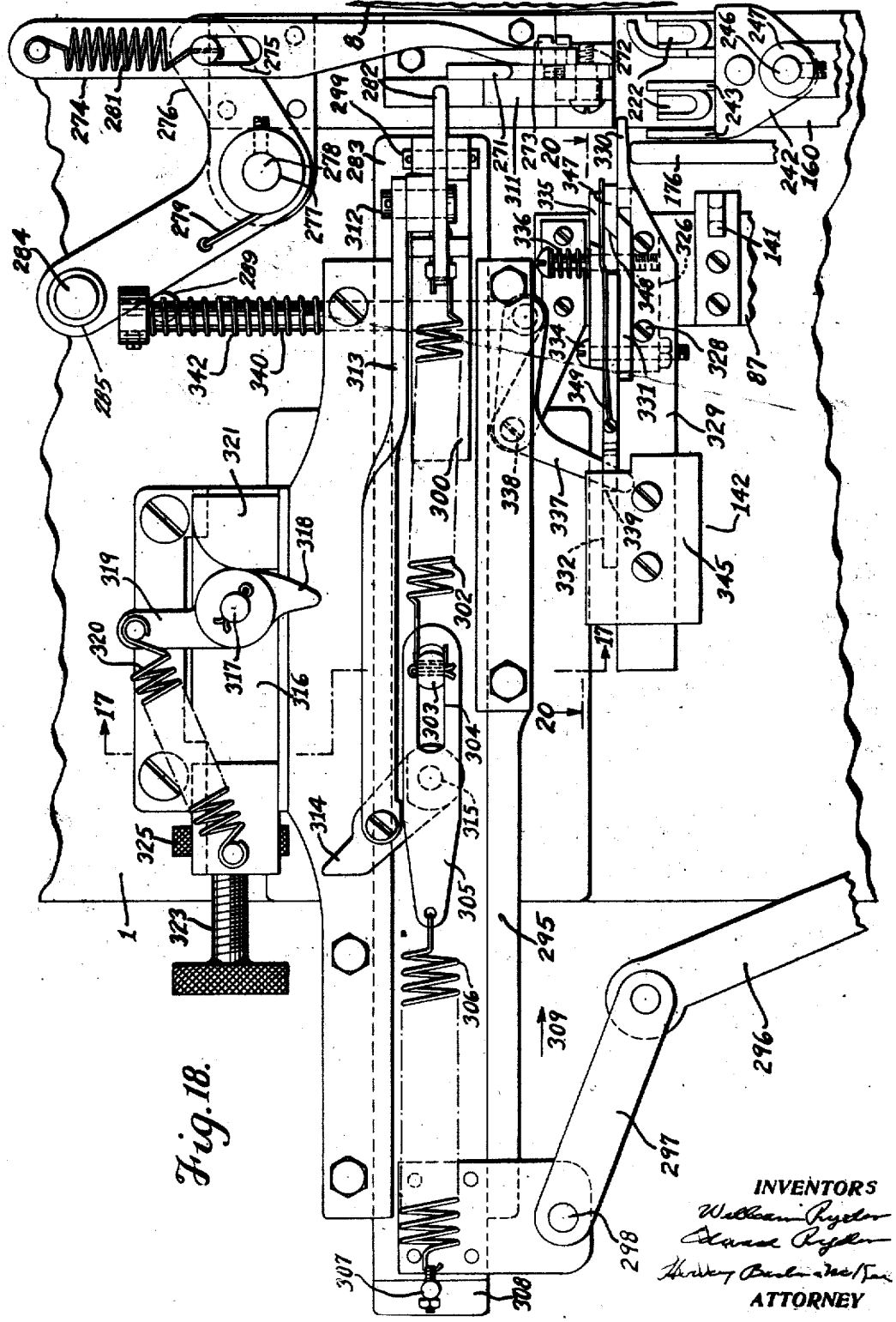

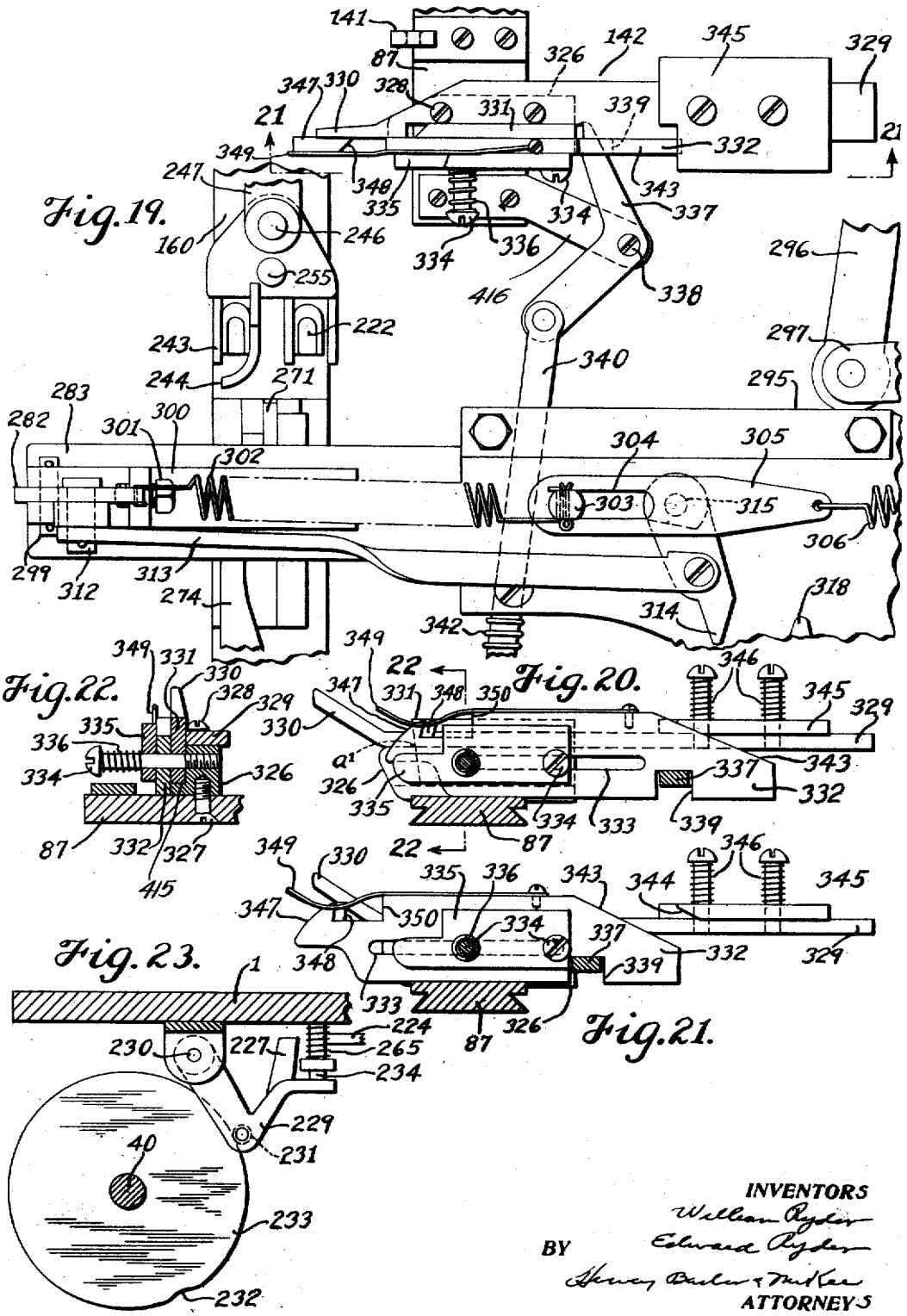

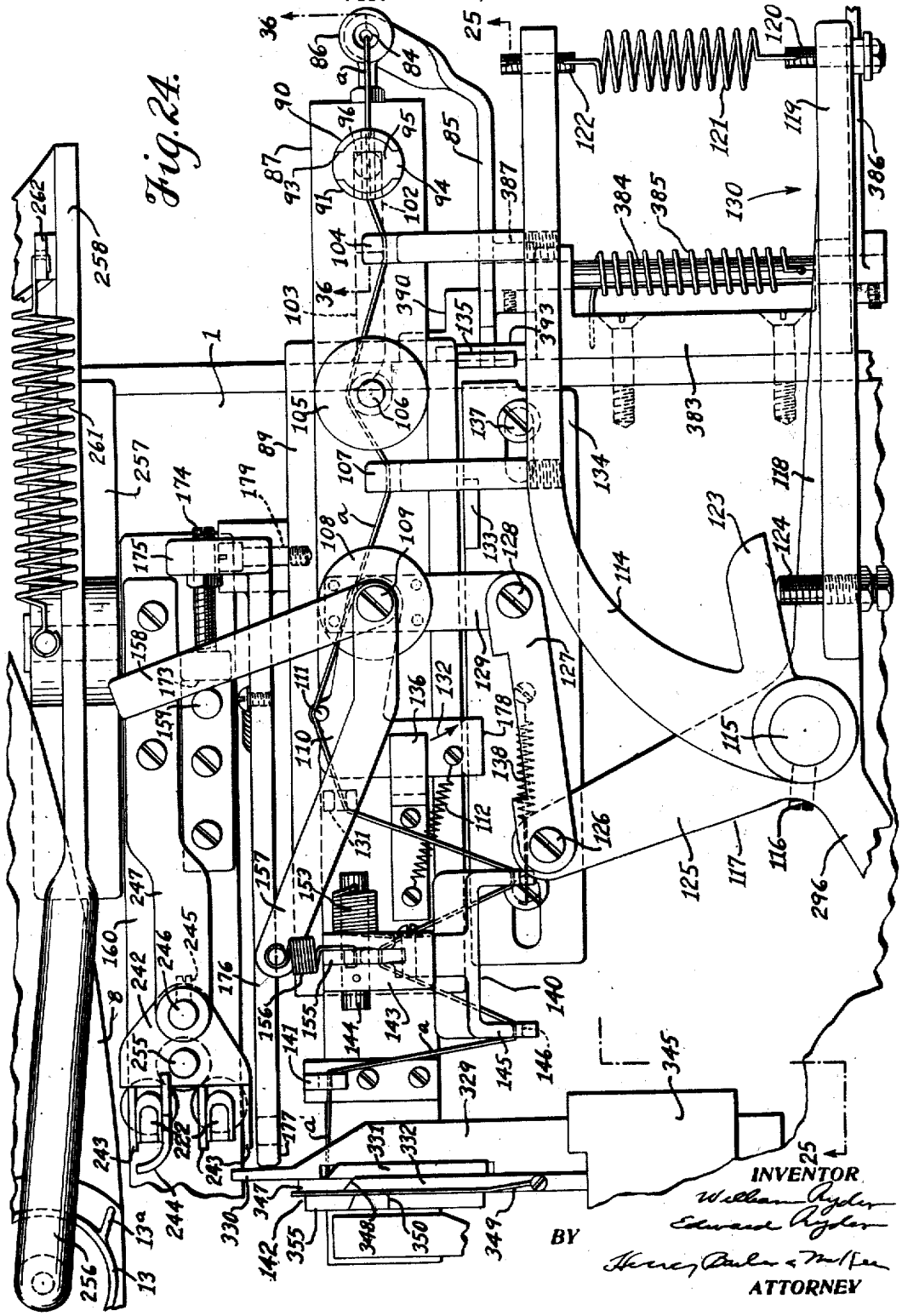

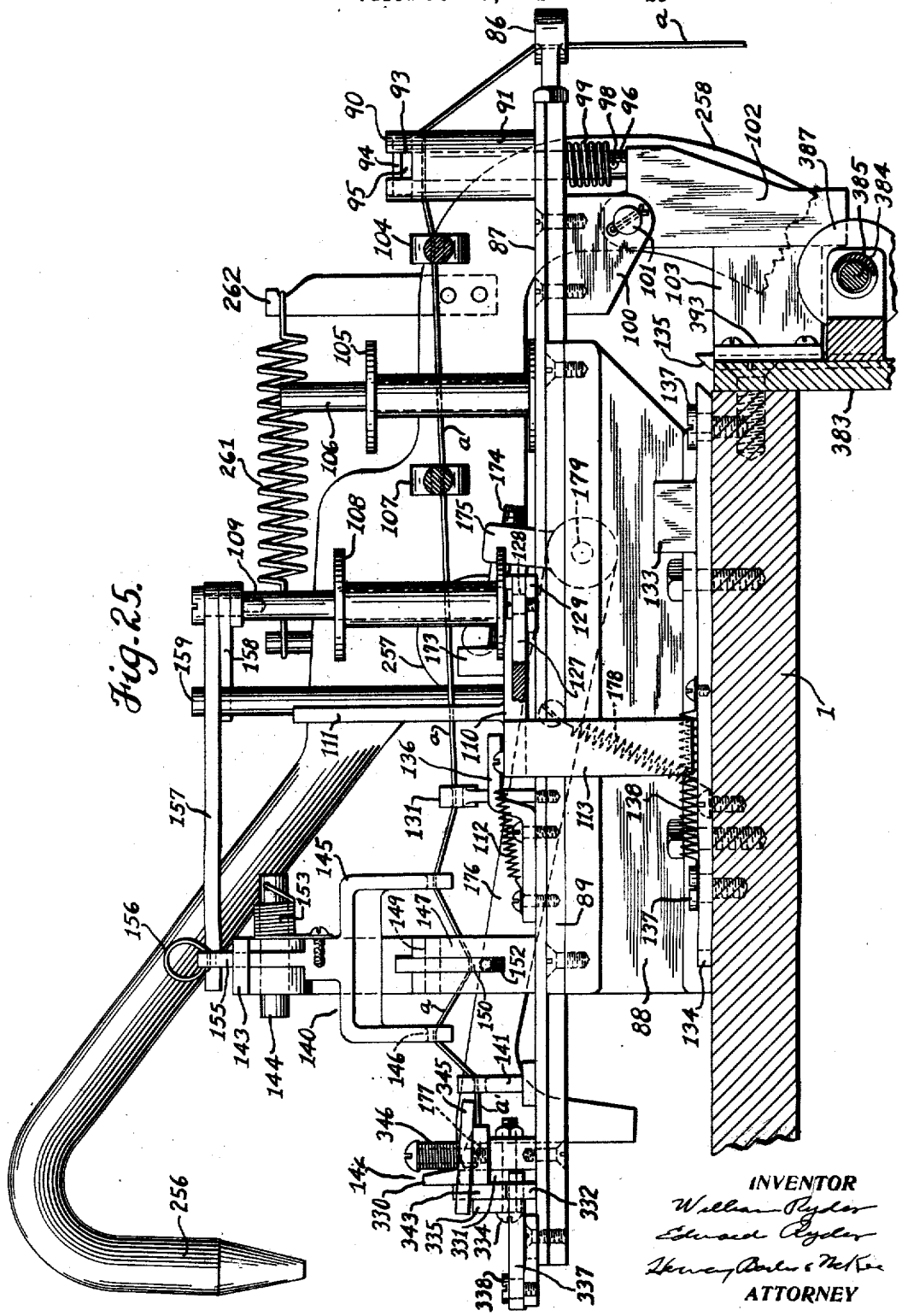

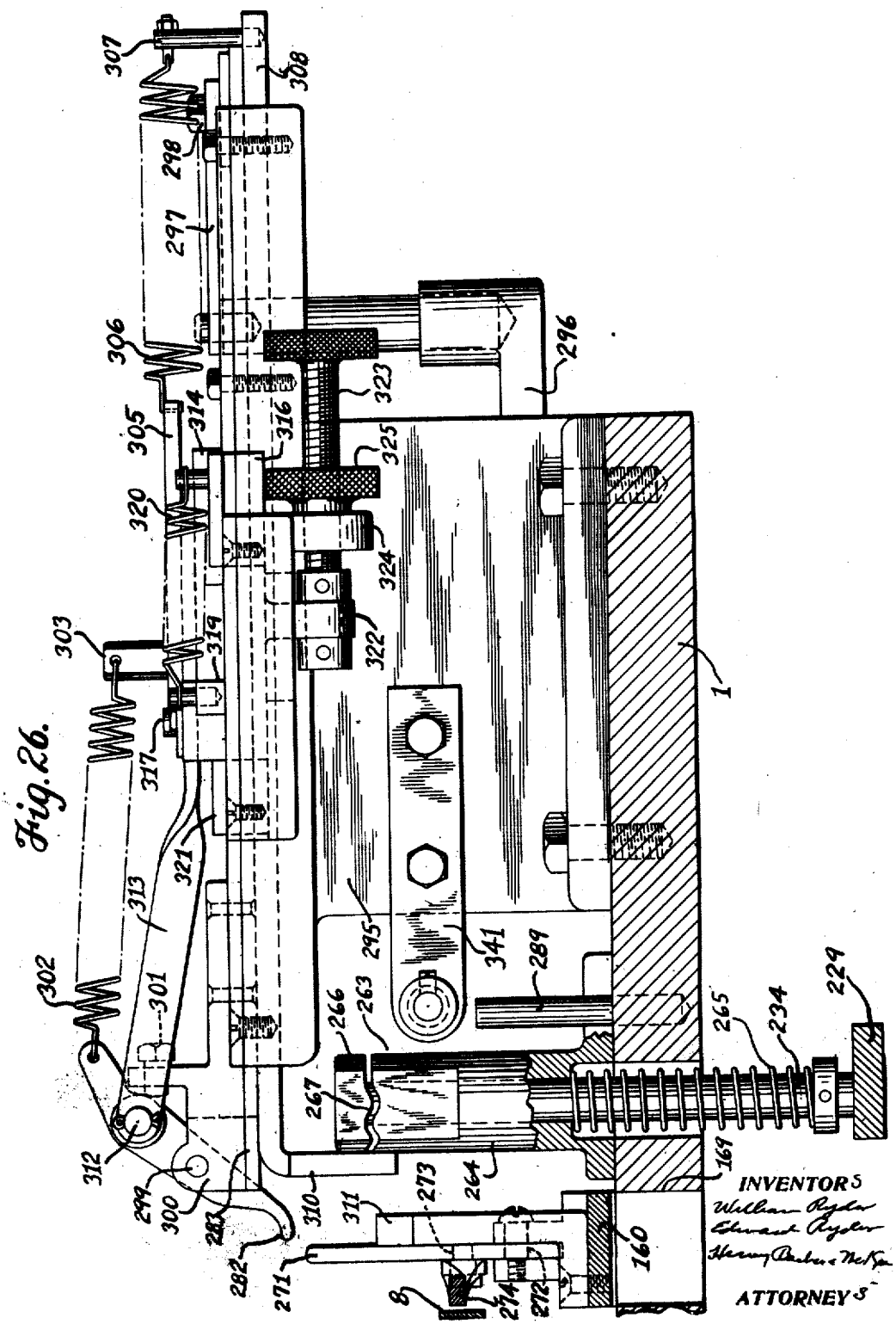

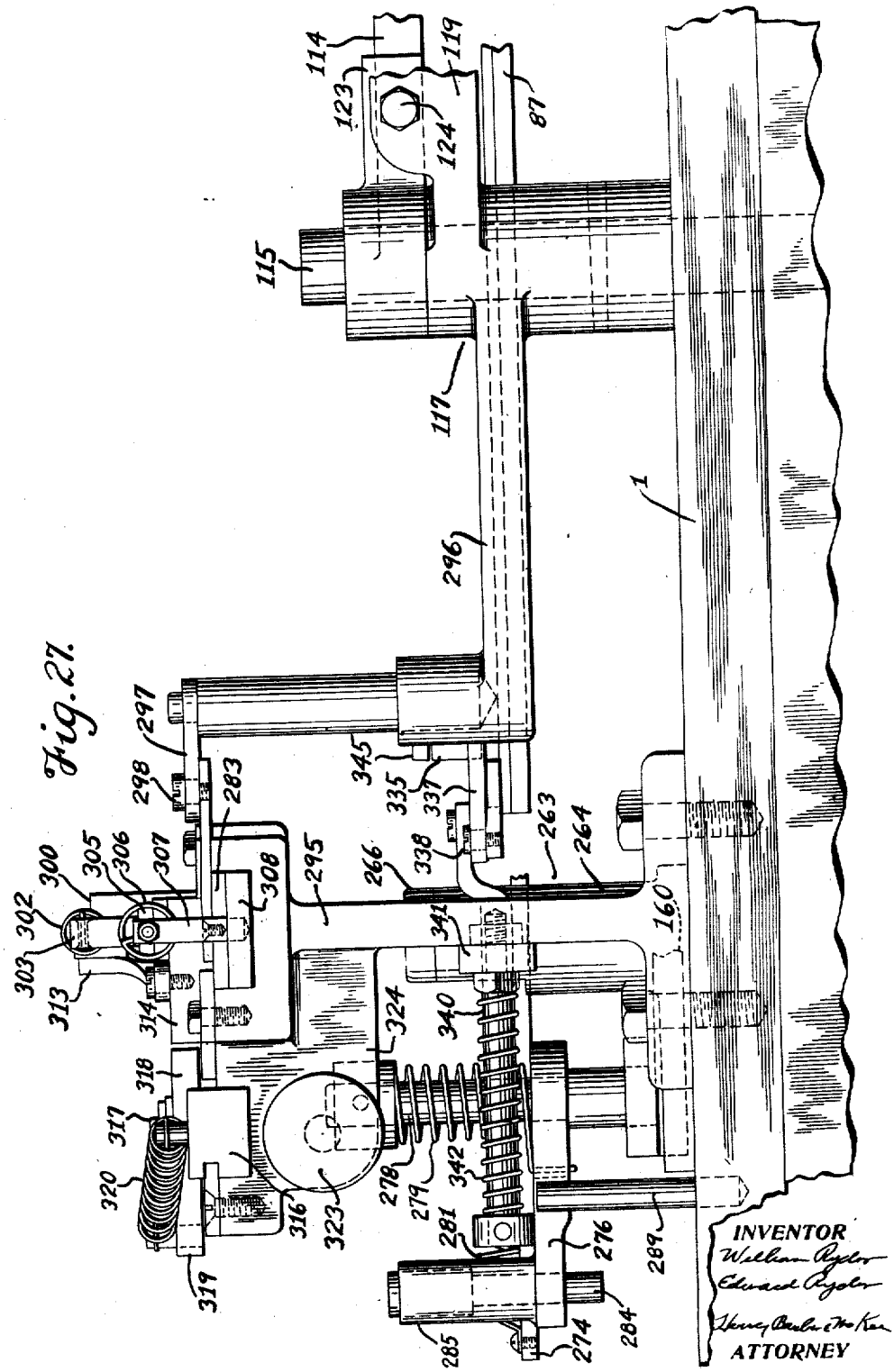

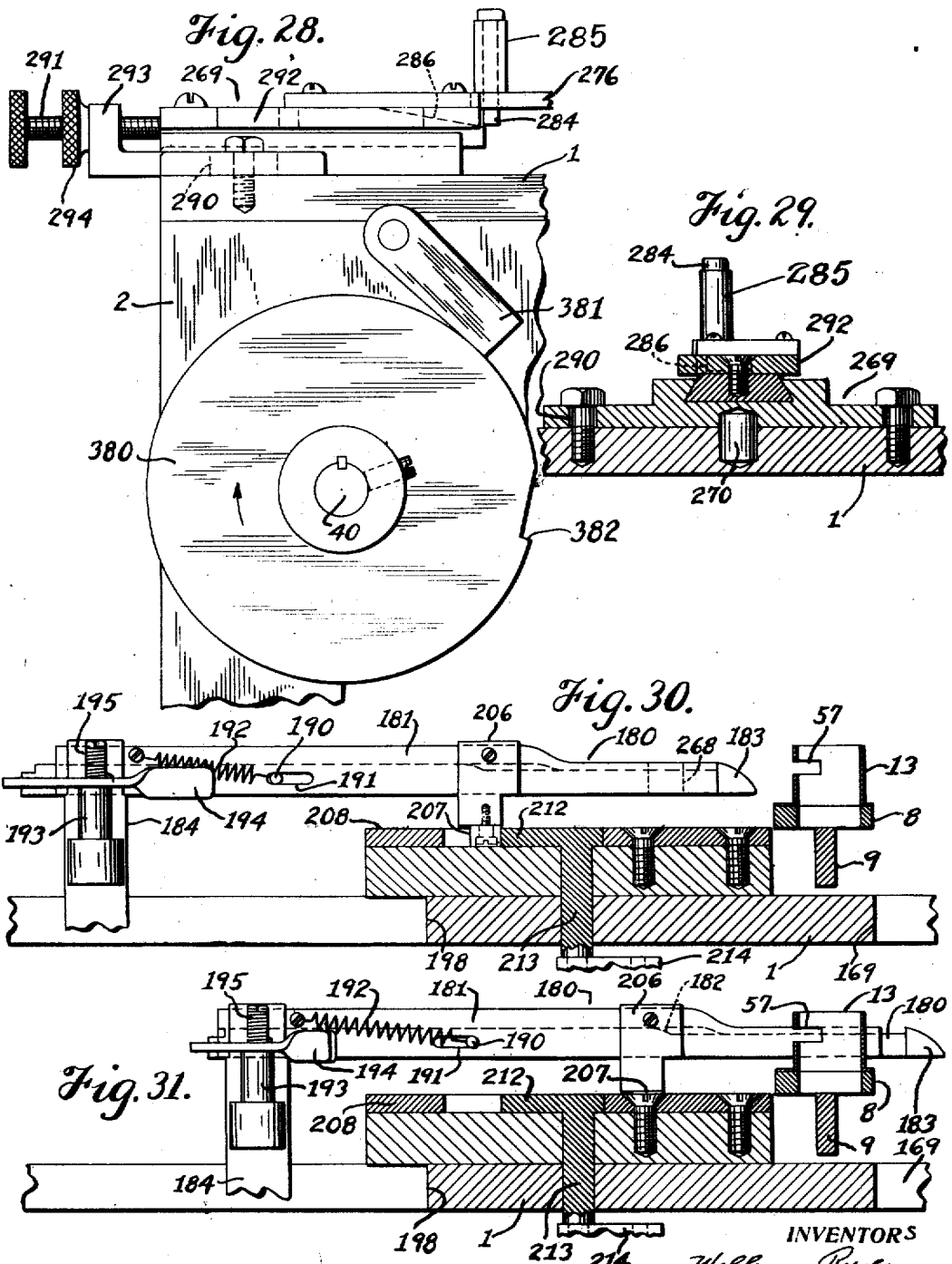

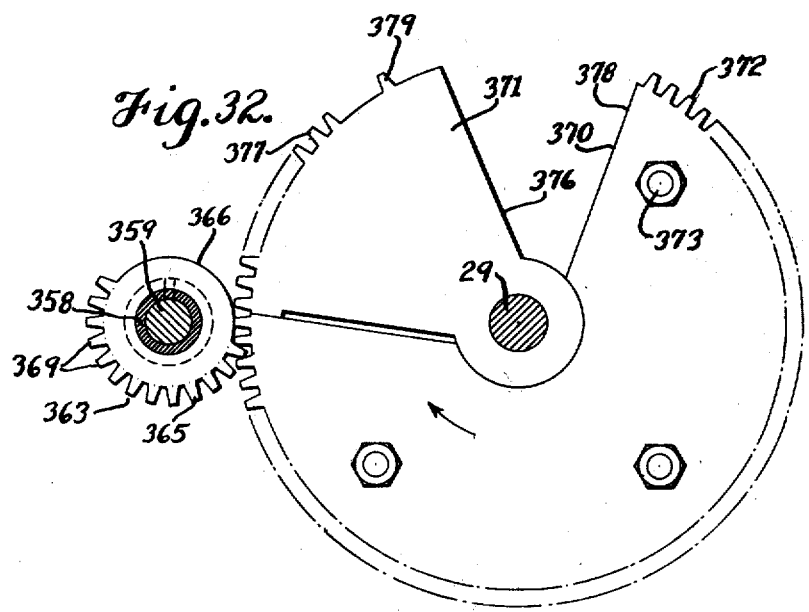
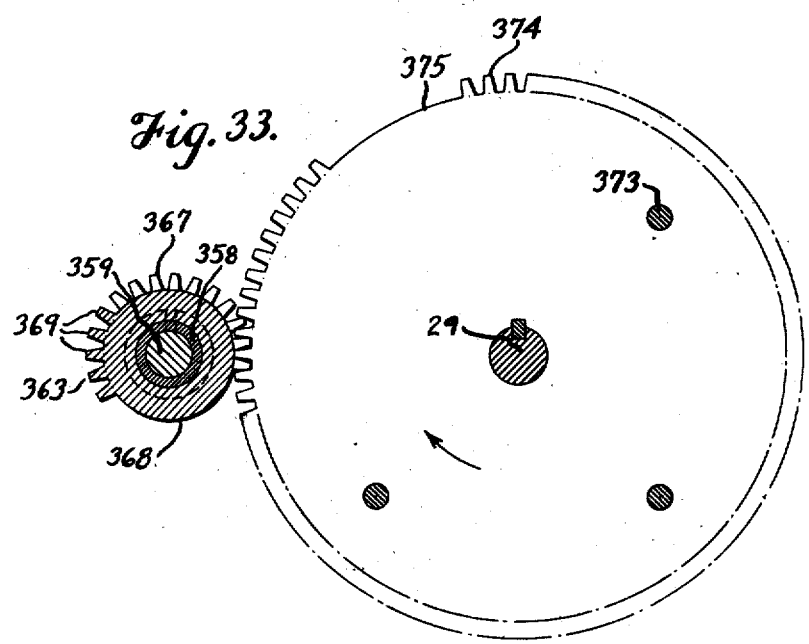

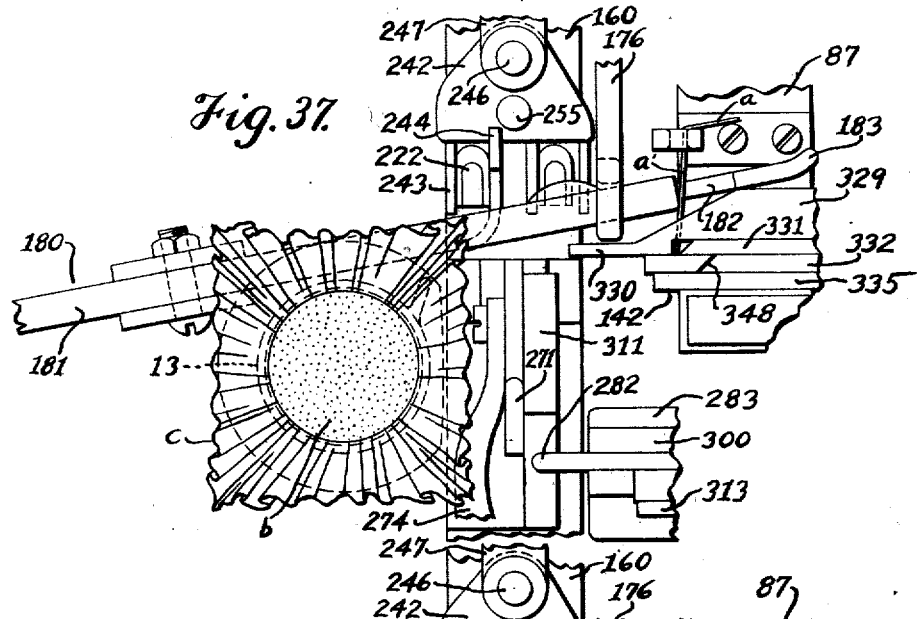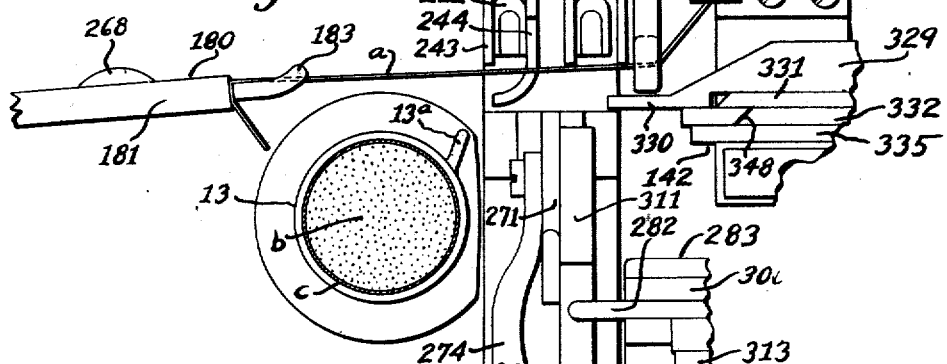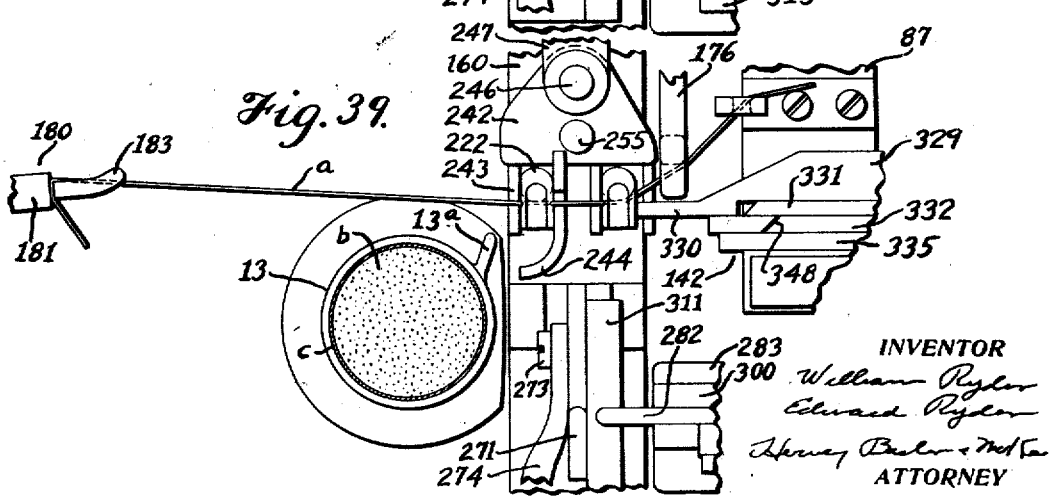

June 24, 1924.
W. RYDER ET AL
WRAPPING AND TYING MACHINE
Filed Feb. 3, 1922 25 Sheets-Sheet 22
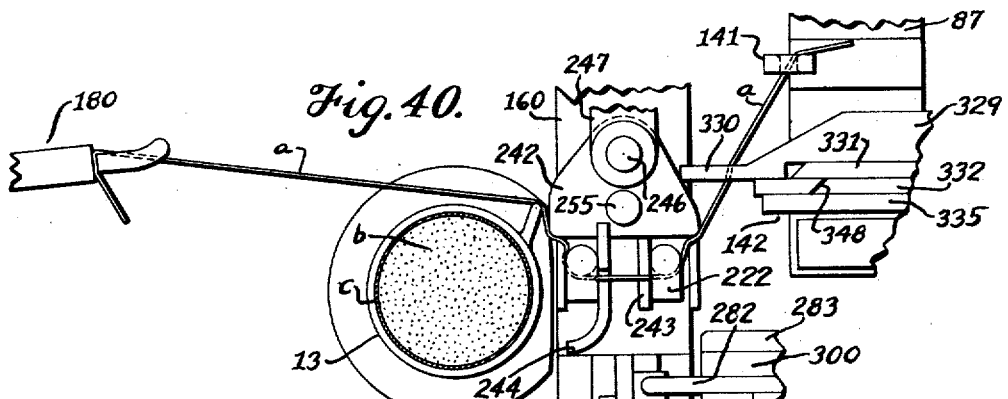
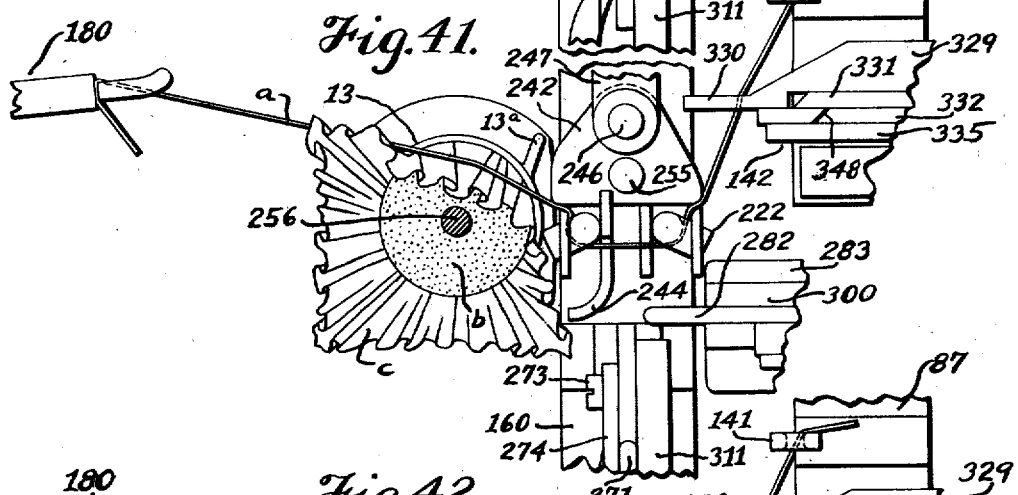
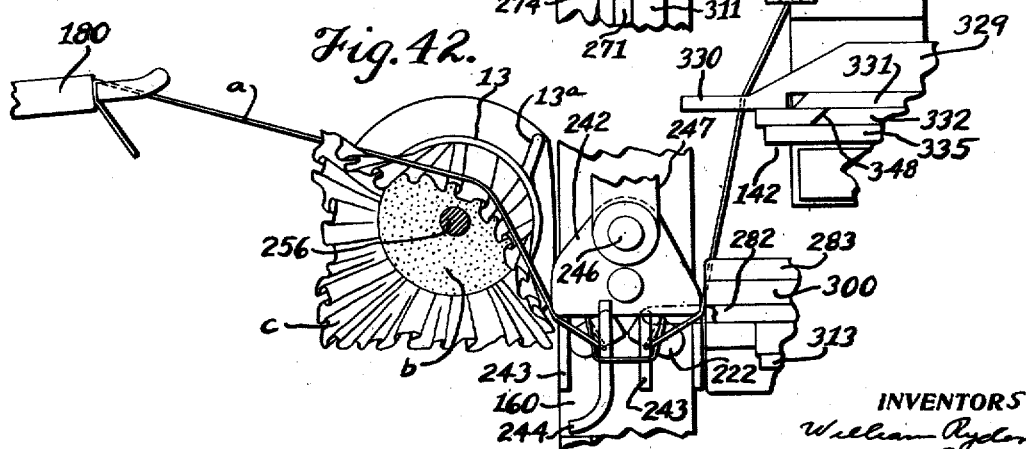
INVENTORS
William Ryder
Edward Ryder
BY
Henry Barlow & McPhee
ATTORNEYS

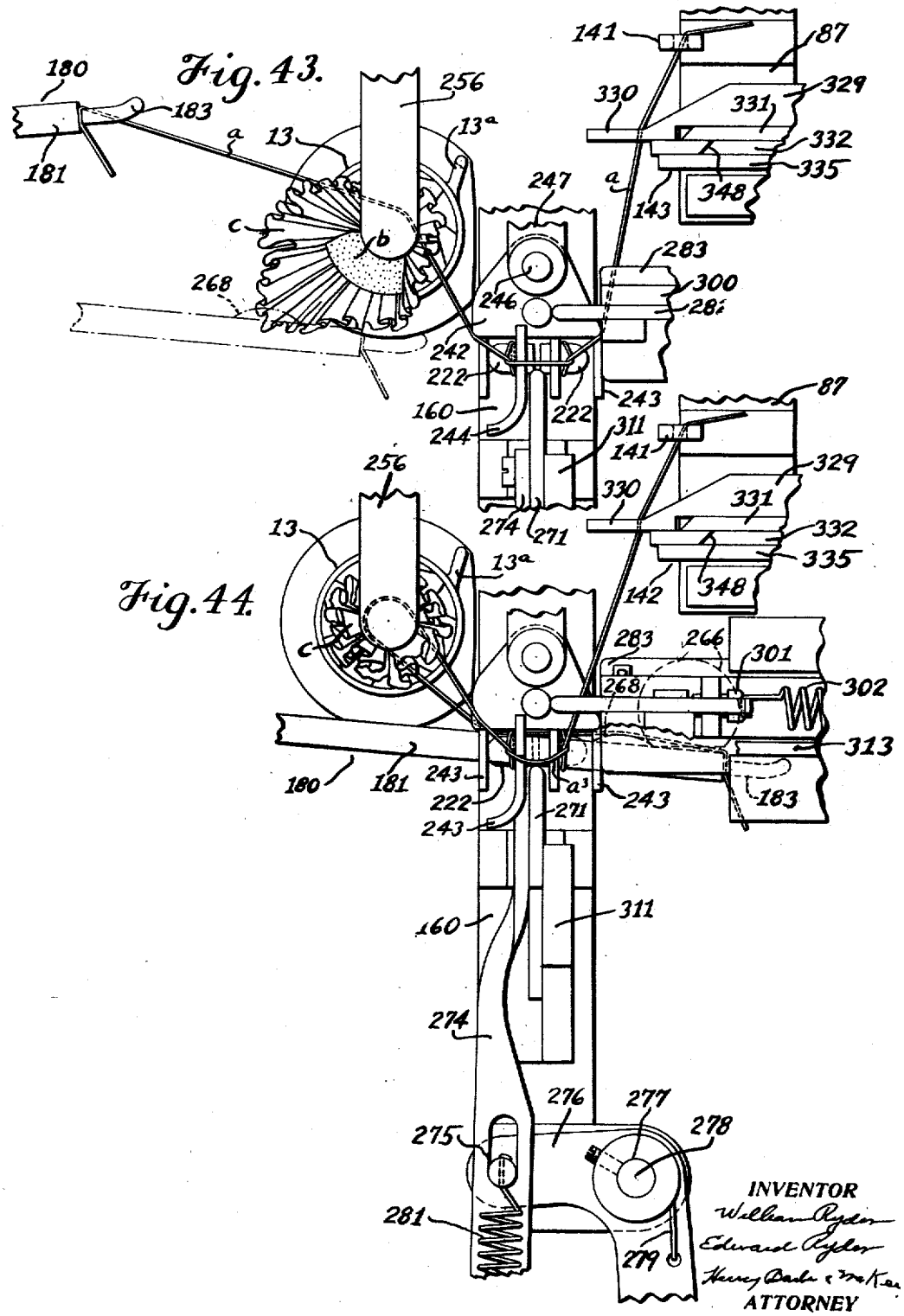

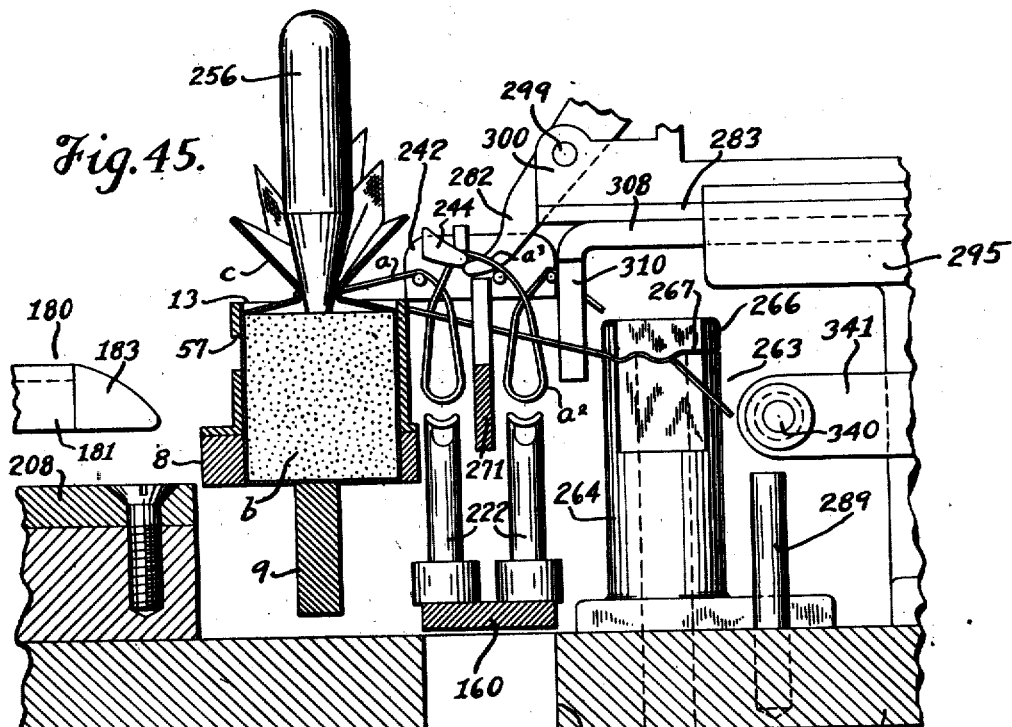

June 24, 1924.

W. RYDER ET AL

WRAPPING AND TYING MACHINE

Filed Feb. 3, 1922     25 Sheets—Sheet 25

1,498,981

INVENTOR
William Ryder
Edward Ryder
BY
Harvey Barber & McKee
ATTORNEY

Patented June 24, 1924.

1,498,981

UNITED STATES PATENT OFFICE.

WILLIAM RYDER AND EDWARD RYDER, OF NEW BRUNSWICK, NEW JERSEY, ASSIGNORS TO RECKITTS (U. S. A.), LTD., OF NEW YORK, N. Y., A CORPORATION OF GREAT BRITAIN.

WRAPPING AND TYING MACHINE.

Application filed February 3, 1922. Serial No. 533,884.

*To all whom it may concern:*

Be it known that we, WILLIAM RYDER and EDWARD RYDER, citizens of the United States, residing at No. 95 Throop Avenue, New Brunswick, in the county of Middlesex, State of New Jersey, have jointly invented a new and useful Improvement in a Wrapping and Tying Machine, of which the following is a specification.

This invention relates to a machine for wrapping and tying an article, and in its present embodiment is particularly designed to wrap a square piece of cloth around a cylindrical article and tie said cloth in place around the article. The machine is used for wrapping cylindrically shaped pieces of laundry blue in cloth and tying a string around the open end; however, any solid article of substantially cylindrical shape could be wrapped and tied in the present machine and the machine could be so adapted that articles of numerous other shapes and sizes could be wrapped with different styles of coverings and tied with a string, without changing in any way the principles or mode of operation of the invention.

The invention provides a means of assembling a wrapper and the article to be wrapped, and an intermittently rotated carrier to carry the assembled article to a looping and tying mechanism, where a string is tightly secured around the open end, or neck, of the package. After the package has been completely wrapped and tied, means are provided for ejecting it from the carrier. Thus the operator is not required to touch the string or handle the wrapper or article except when placing them in the machine.

At the present time, in the industry the blue is wrapped and tied by hand. This is very hard and onerous work and also very slow. With the present machine a large number of operators are saved and the production vastly increased.

In the tying mechanism, means are provided for carrying the string around the open end of the package, the string gathering the wrapper together, and other means are provided for looping the string. The free end of the string is carried through the looped portion and while the string is being held, the looped portion is tightened and the knot is formed.

The knot tied by this machine and which it is preferable to use is a square, or reef, knot. After the knot has been tied, suitable cutting mechanism cuts the string and holds the end coming from the supply, so as to be in readiness for the next cycle.

Novel safety devices are provided to stop the machine in case the string should break while in the machine or become tangled, or knotted, prior to entering the machine. The machine is also arranged, so that if one of the holders on the carrier is empty, or if an imperfect article is placed in a holder, the machine will automatically stop.

The parts of the machine are so designed and constructed that, despite the intricate work that is accomplished, they are positive and accurate in their action and will not readily get out of order, and if it should happen that any parts do get out of order, or need adjusting, the operator can take care of them. The parts and movements on the machine are all easily accessible for adjustment, or other purposes.

Numerous other novel features and advantages will be brought out in the following specifications and illustrated in the drawings forming a part thereof.

Referring to the drawings:—

Fig. 1 is a top plan view of the entire machine, with the parts in the position they would assume when the machine is not in operation.

Fig. 2 is a front elevation.

Fig. 3 is an end elevation looking from the right showing the parts in a position they would assume while the machine is not in operation.

Fig. 4 is a view similar to Fig. 3, showing the position the parts assume while in operation.

Fig. 5 is a view similar to Figs. 3 and 4, showing the parts in the position they would assume, if one of the articles to be wrapped had been omitted from its holder.

Fig. 6 is a cross sectional view on a somewhat larger scale, taken on the line 6—6 of Fig. 1.

Fig. 7 is a sectional bottom plan view taken on the line 7—7 of Fig. 3. This view is on the same scale as Fig. 6.

Fig. 8 is a fragmentary top plan view showing the position certain parts of the machine would assume when in operation, this view being on the same scale as Figs. 1 to 5.

Fig. 9 is a partial front elevation similar to Fig. 2, showing the position certain parts would assume when in operation.

Fig. 10 is a detail sectional plan view on a larger scale, taken on the line 10—10 of Fig. 3. This view shows certain parts of the intermittent driving mechanisms.

Fig. 11 is a detail sectional view on the line 11—11 of Fig. 10.

Fig. 12 is an enlarged, fragmentary, detail view of part of the mechanism for stopping the machine, when the string breaks or becomes knotted.

Fig. 13 is a front view of the mechanism seen in Fig. 12.

Fig. 14 is a sectional view taken on the line 14—14 of Fig. 13.

Fig. 15 is a detail sectional view taken on the line 15—15 of Fig. 1. This view shows particularly the slide which carries the looping mechanism and the cam operating said mechanism.

Fig. 16 is a detail sectional view, taken on the line 16—16 of Fig. 1. This view shows particularly the slides which carry the looping mechanism and the tensioning mechanism respectively.

Fig. 17 is a detail cross sectional view taken on the line 17—17 of Fig. 18. This view shows particularly the slide which carries the knot tightening mechanism.

Fig. 18 is an enlarged top plan view showing the slides which operate the knot tightening mechanism and the end of the slide carrying the looping mechanism and also parts of the knot tightening mechanism.

Fig. 19 is a view similar to Fig. 18 with a number of the parts left off for simplifying the illustration and showing the parts in another position.

Fig. 20 is a detail sectional view showing the string cutting mechanism, the view being taken on the line 20—20 of Fig. 18.

Fig. 21 is a view similar to Fig. 20 showing the cutting mechanism in another position. In this view the parts of the mechanism are in the same position as in Fig. 19.

Fig. 22 is a sectional view taken on the line 22—22 of Fig. 20.

Fig. 23 is a detail sectional view showing the operating means for the device that holds an end of the string while the knot is being tied, and the stop which controls the rotation of the loops. This view is taken on the line 23—23 of Fig. 7.

Fig. 24 is an enlarged plan view showing the slide which carries the tensioning mechanism and the cutting mechanism and other adjacent parts of the machine.

Fig. 25 is a sectional view, taken on the line 25—25 of Fig. 24.

Fig. 26 is an enlarged sectional view, taken on the line 26—26 of Fig. 1. This view shows particularly the slides which control the knot tightening mechanism.

Fig. 27 is a front view of the parts shown in Fig. 26.

Fig. 28 is an end elevation of the stationary cam, operating part of the knot tightening machine. This view also shows the pawl and toothed wheel which takes care of the back lash in the machine.

Fig. 29 is a cross sectional view of the cam shown in Fig. 27, the view being taken on the line 29—29 of Fig. 1.

Figs. 30 and 31 are sectional views, showing the needle and its operating mechanism in two different positions.

Fig. 32 is an elevation of a set of driving gears and pinions, showing the condition when the machine is not operation.

Fig. 33 is a similar view, taken on the line 33—33 of Fig. 1.

Figs. 34 and 35 are views similar to Figs. 32 and 33, showing the position when the machine is in operation.

Fig. 36 is a detail sectional view, taken on the line 36—36 of Fig. 24 and showing the method of holding the string on the end of the tensioning device slide.

Figs. 37 to 44 are schematic plan views showing the different positions the parts assume while the string is being looped and the covering on the article to be wrapped is being gathered together preparatory to the final tying of the knot.

Figs. 45 and 46 are schematic views, showing further steps in the tightening of the knot.

Figure 47:
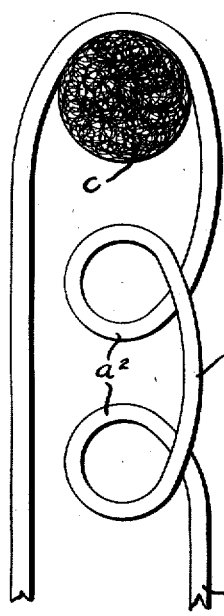
Figs. 47 to 51 are enlarged schematic views, showing different positions the string assumes while the knot is being looped and tied.

The machine has a bed plate 1, supported upon legs 2 and 3. Mounted in bearings 4, secured to the leg 3 is an upright shaft 5. Fixed to the upper end of the shaft 5 is a hub 6 provided with spokes 7 which are connected to the large ring or carrier 8, thus providing the driving connection for said ring or carrier.

The carrier is supported on small rollers

9ª, mounted on the ring 9, which has a segment thereof omitted for reasons hereafter explained. This supporting ring 9 is held to plates 10, which extend out from and are fastened to the bed plate, by small brackets or yokes 11. Angle irons 12 secured to the plates 10 or bed plate 1 further support the ring 9. The rollers 9ª are mounted on the supporting ring 9, to reduce the friction between the rotatable carrier 8 and the ring 9.

The carrier 8 has secured thereto a plurality of holders 13. Each holder 13 is located over the supporting ring 9 and holes are provided in the carrier the same diameter as the inside of the holders and located directly under each holder.

At the front of the machine, supported on one of the plates 10 is a bracket 14 which carries a shallow pan or plate 15, preferably of the shape of the covering to be used for wrapping the article. In this instance, since a square wrapper is being used, the pan is made square. The pan has an arcuate slot 16 extending from its right hand end approximately to the central portion thereof. The movement of the carrier is so arranged that a holder always stops directly under the closed end of the slot as seen in Fig. 1.

While held in this position by mechanism hereafter described, the operator lays in the pan a square piece of cloth which, being approximately the same size as the pan, covers it. A piece of blue or the article to be wrapped is then forced down by the operator, until it touches the supporting ring 9. The carrier is then rotated, the free ends of the covering passing thru the slot 16, and the operator fills the next holder as it is brought under the pan.

As heretofore mentioned, suitable mechanism is provided to rotate the carrier intermittently. This mechanism will now be described. A ratchet wheel 17, having a number of teeth corresponding to the number of holders 13 on the carrier 8, is pinned or keyed to the lower part of the upright shaft 5. This ratchet wheel 17 is engaged by a pawl 18 mounted on a bracket 19 and held in contact with the ratchet 17 by a spring 20. The bracket 19 is bolted or otherwise secured to the slide 21, Fig. 6, which has slots 22 at either end and studs 23 mounted on the leg 3 and passing through the slots 22, allowing the slide to be reciprocated. On the front end of the slide 21 is mounted a roller 24, which engages with the edge of one arm of a bent lever 25 pivoted on the frame at 26. The opposite end of this lever 25 carries another roller 27 which engages the cam 28 mounted on the end of the driven shaft 29. This shaft is carried in bearings 30, bolted to the frames or legs 2 and 3. A spring 31 secured at one end to a stud on the intermediate part of the slide 21, and at its other end to the leg 3, forces the slide and pawl back to its normal position, after the ratchet and carrier have been advanced one step by the pawl and slide, under control of the cam 28.

Attention is called at this time to the fact that while the operator is feeding into one of the holders an article to be wrapped and its covering, the carrier is being held stationary and mechanism designated generally "A" is operating to wrap and tie up the article. An ejector, afterwards described, is also at this time forcing from its respective holder one of the articles that has been completely tied and wrapped. The elements of the machine are so timed that this takes place while the carrier is stationary. While the carrier is being advanced one step, it is desirable that the wrapping and tying mechanism designated "A" be held out of operation. Means are provided for doing this work in conjunction with the carrier advancing mechanism and said means will now be described.

Mounted on the slide 21 adjacent to the bracket 19 is a stop 32. This stop 32 fits into a notch 33 in an L shaped lever 34 pivoted at 35 on the leg 3 when the carrier 8 is stationary. Pivoted at 36 near the upper end of the lever 34 is a link 37 which has a cut out part 38 near its opposite end. This cut out part fits over a stud 39 on the bent lever 25, thus connecting said bent lever 25 with the L shaped lever 34.

A shaft 40, parallel to the shaft 29 is supported in bearings 41 and carries a sprocket wheel 42 which is loosely mounted on said shaft 40. Through the medium of a sprocket chain 43 and sprocket wheel 44 mounted on the shaft 29, the sprocket 42 is driven. Suitable means which will be next described are provided, in order that the sprocket 42 will be connected with, and drive, the shaft 40. The bearing at the right hand end of the shaft 40 is a bushing, bolted at 45 to the frame 3.

The end of the shaft 40 has a keyway 46 cut therein (Figs. 10 and 11) in which a key 47 is located. Pinned at 48 to said shaft 40 is a sleeve 49, which is slotted adjacent to the keyway 46 to accommodate and guide the key 47. The face of the hub of the sprocket wheel 42 is slotted at 50, so that when the key 47 is permitted to slide into engagement with one of the slots 50, the sprocket wheel 42 will rotate the shaft 40, and when the key is withdrawn, as in Fig. 10, the sprocket wheel will rotate idly on the shaft 40 and not rotate it. Since this shaft has on it the cams that control the mechanism "A," it is obvious that said mechanism "A" will not operate, when the shaft is not rotated.

The key 47 is pulled into engagement with the slots 50 by a spring 51, one end of which is secured to a stud on the key and the opposite end to the sleeve 49, or to a strap held on the sleeve. The sleeve 49 has an annular shoulder 52 formed on its intermediate part and the key 47 is also provided with a shoulder 53. The lever 34 has near its upper end a pin or stud 54. As shown in the drawings, the lever 34, resting behind the shoulder 53 of the key, holds the key out of engagement with the slots 50. During this time, the shaft 40 is not rotating and consequently the mechanism "A" is not operating. The lever 34 is pulled out of engagement with the key 47 by the link 37. As the link 37 is connected to the bent lever 25, which operates the ratchet and pawl to advance the carrier, it will be easily understood that the said mechanism will advance the carrier one step, before the lever 34 is released from the shoulder 53 on the key. When the mechanism has reached the position shown in Fig. 4, the carrier has been advanced one step and is held rigid by suitable means, hereafter described and the key 47 has engaged one of the slots 50 and the mechanism "A" is functioning.

As the cam 28 and the lever 34 move toward the position shown in Fig. 3, the spring 55 urges said lever towards the locking position shown in said figure and the member 32 on the slide 21 forces it into its final position and holds it there. The upper end of the lever 34 is slabbed off as shown at 56 in Fig. 11 and forms a wedge which is entered between the shoulders 52 and 53, to force the key 47 to move out of engagement with the slot 50. The pin 54 insures stopping the mechanism at the proper time, so as to prevent any overrunning from momentum and to make certain, before each successive operation, that the mechanism "A" is in the correct position to function.

A mechanism is provided for stopping the machine, if the operator fails to put an article in one of the holders 13, or if an imperfect article is placed in the holder. The holders 13 are provided with slots 57. Mounted on the bed plate is a slide 58, having slots 59, in which are mounted studs 60, secured to the bed plate, thus allowing the slide 58 to be reciprocated. The end of the slide nearer the carrier 8 has a bracket 61 mounted thereon. The outer end of this bracket comes in contact through said slots 57 with each article as it passes. If no article or an imperfect article is in the holder as it passes the bracket 61, the end of the bracket will enter the slot 57 as shown in Fig. 1. The slide is moved by the spring 62, one end of which is held to a pin on said slide and the opopsite end of which is attached to one of the studs 60 as hereinafter described.

The slide has riveted or otherwise secured to it at the end opposite the bracket 61 a cross member 63. One arm of this cross member has a downwardly extending part 64, on the lowermost part of which is mounted an adjustable screw and locknut 65. It will thus be clear from an inspection of the drawings that, when the end of the bracket 61 enters a slot 57 in one of the holders 13, the screw 65 will force the lever 37 to move towards the leg 3 of the machine. The pivot 36 of said lever is a loose fit and is so arranged as to allow this movement.

Attention is now directed to the stud 39 and cut out part 38 of the lever 37. The part of the stud 39 nearest the head has a slabbed off portion 66 and the cut out 38 on the lever 37 has a notch 67, in the corner nearest the front of the machine. Normally, as in Figs. 3 and 4, the parts are so arranged that the slabbed off portion 66 of the stud engages the notch 67. When the screw 65 forces the lever 37 inward, as it does when there is no article in the holder, the notch 67 is disengaged from the slabbed off part 66 of the stud 39, and is moved inward to the rounded part of said stud 39. In this position it will not hold, because as the lever 37 is forced inward it is raised as it rides up on the rounded part of the stud 39, and due to the shape of the cut-out part 38 said cut-out part slides off the stud 39, as shown in Fig. 5. Thus, as the bent lever 25 is out of engagement with the stud 39, the lever 37 will not operate the lever 34 and allow the key 47 to function. Therefore, the mechanism A, which is controlled by the shaft 40, will not operate when there is no article in the holder.

The mechanism for holding the carrier stationary after it has been advanced a step will now be described. One end of the cross arm 63 has the downward extension 64, for purposes previously described. At the opposite end of said cross arm is a slotted pivot connection 68 for a link 69, which is pivoted at 70 to a lever 71, which in turn is pivoted at 72 to the bed plate 1. The end of the lever 71, adjacent the carrier 8 bears a pin or stud 73, which is adapted to engage notches 74 in the carrier 8. At the opposite end of the lever 71 is secured a spring 75, which tends to force the pin 73 towards the carrier and into the notches 74.

Pivoted at 76 to the lever 71 is a link 77, which in turn is pivoted at 78 to a lever 79, which is pivotally mounted at 80 in the bed plate. The lever 79 extends downward at its outer end and carries a roller 81 which engages a cam 82 mounted on the disc 83 which is carried by the shaft 29. This cam, through the chain of linkage just described, moves the pin 73 out of engagement with one of the notches 74 and allows the carrier to be rotated. The cam is so timed, in its relation to the other mechanism, that when the next notch appears the pin 73 will be forced therein.

The slotted pivot connection 68 allows bracket 61, mounted on the slide 58, to be kept out of engagement with the holder and its contents, except at the time when the carrier is stationary. If the holder be properly filled, the pin 68' will be in the end of the slot opposite that shown in Fig. 1, but if it be empty as shown in Fig. 1, the pin can slide in the slot and pull the screw 65 inward, without interfering with the linkage controlling the pin 73. When the carrier is being rotated as is shown in Fig. 8, the slide 58 and bracket 61 are withdrawn by the lever 71 from any contact with the holder or its contents, provided the holder is properly filled.

The string *a* is supplied from a bobbin, spool, ball or any other suitable source, not necessary to illustrate, and is led through a hole 84 in a pivoted member 85. This member guides the string, but primarily it operates a mechanism which stops the machine in case the string is tangled or knotted prior to entering the machine and passing through the hole 84 in said member 85. This pivoted member 85 is also part of the mechanism which stops the machine, if the string breaks while in the machine. The operation of this mechanism will be explained later.

From the hole 84 in the member 85 the string is led through a fixed eye 86 on the end of a reciprocating slide 87, Figs. 24 and 25. This slide is dovetailed and mounted in a bracket 88 secured to the bed plate, the slide being held in place by retaining strips 89.

The string then passes through a gripping device 90 for holding it firmly while the knot is being tied. Fig. 36 shows the gripping device and its actuating mechanism holding the string. The gripping device consists of a hollow post 91 riveted or otherwise secured near the outer end of the slide 87. The upper part of the post is counter bored and provided with two slots or openings 92 diametrically opposite each other, through which the string passes. Two keyways 93 are also provided to accommodate a pair of ears 94 on the head 95 of a rod 96 which fits in the bore of the post 90. The rod 96 has a passage 97 through it, in line with the slots 92 so that when the pin is raised as is shown in Fig. 25, the string is free to pass through, but when the pin is lowered as in Fig. 36, the string is firmly gripped and held against movement in either direction. The lower end of the rod 96 has a pin 98 passing through it, which confines a spring 99 between said pin and the bottom of the slide and tends to pull the head 95 of the rod 96 down to grip the string.

A bracket 100 secured to the underneath part of the slide 87 has pivoted therein at 101 a detent 102. This detent 102 is engaged by an extension 103 held to the bed plate. When the slide is in its outward position, as in Fig. 36 the detent 102, being loosely mounted, allows the spring 99, to function, thus pulling the rod down and gripping the string. When the slide is pulled inward by suitable mechanism, afterward described, the detent comes in contact with the member 103, and the rod 96, is forced upward, thus allowing the string to be freely drawn through the gripping device 90.

The string next passes through the eye of a stud 104 forming part of a tensioning device, the operation of which will hereafter be described and thence the string passes over a spool 105 rotatably mounted on a stud 106 secured to the slide 87. From the spool 105 the string passes through the eye of another stud 107 similar to 104 and forming part of the aforesaid tensioning mechanism. The string then passes over another spool 108, mounted on a stud 109 secured to said slide 87.

Pivotally mounted on the stud 109 which carries the spool 108 is a lever 110 which carries an upright pin 111 around which the string is passed. This lever has one end of a spring 112, attached to it, the other end of said spring 112 being attached at any convenient place to the slide 87. As shown in Fig. 24, the slide is in its inward position and the gripping device 90 is released, and in this position as there is no tension on the string, the spring 112 will hold the lever 110 in the position shown in said Fig. 24, as the lever has a downward extension 113 which bears up against the bracket 88 and will not permit it to move.

The tensioning device previously mentioned of which the two studs 104 and 107 form a part, consists of a long curved arm 114 loosely pivoted on the stud 115. Fixed by a set screw 116 to the stud 115, is a three armed member 117. The arm 118, of this member 117, bears an upstanding flange 119 to which is secured at its outer end, by means of an adjustable screw connection 120, a spring 121. The opposite end of the spring 121 is secured by another adjustable screw connection 122, to the outer end of the free arm 114. Near the pivot 115 of the arm 114 is a toe 123 integral with said arm. An adjustable screw connection 124 bears against, and positions the arm 114, shown in Fig. 24.

Another arm 125 of the member 117 has pivoted at its outer end 126 a link 127 which in turn is pivoted at 128 to a member 129 which is riveted, or otherwise secured, to the slide 87.

When the member 117 is moved in the direction of the arrow 130 in Fig. 24, the slide 87 is moved outward through the medium of the arm 125, the link 127, the part 129, while the gripping device 90, is holding the string. At the same time it will be clear from an inspection of the drawings that the arm 118 through the spring 121, is pulling the arm 114 which carries the studs 104 and 107 through the eyes in the heads of which the string passes away from the slide or position shown in Fig. 24. The free end of the string is held in another gripping device, herein afterwards described. The device just described is for the purpose of tensioning or tightening the string, while the knot is being tied.

Referring again to the lever 110, it is clear from the foregoing description that, when the string is being tensioned, said string will tend to form a straight line between the roller 108 and the fixed eye 131, attached to the slide 87. Thus, when the slide 87 is moved outward, the downward extension 113, being moved in the direction of the arrow 132, will avoid the lug or projection 133, on a slide 134. If the string should break, the lever 110 would not be moved from the position shown in Fig. 24, when the slide 87 is moved outward, and said downward extension 113 would come in contact with the projection 133, and would move the slide 134 outward, where it would come in contact with the vertical slide 135, and would operate suitable mechanism, to be described hereafter, to stop the machine.

The bracket 136 guides the lever 110 and prevents any up and down movement of the lever. Thus it is clear that the purpose of the lever 110 and the slide 134 is to form part of a device for stopping the machine, in case the string breaks. The slide 134 is slotted, and studs 137 passing through the slots, are secured to the bed plate. A spring 138, one end of which is fastened to the slide 134 and the other end to one of the studs 137, keeps the slide withdrawn, except at such times as it is forced outward by the downward extension 113, of the lever 110.

From the fixed eye 131, the string passes through another tensioning device 140. The purpose of this tensioning device is to remove slack, and particularly to keep taut that part of the string between a fixed eye 141, secured to the slide 87, and the string holding and cutting mechanism 142, also mounted on the slide 87. This part of the string designated $a^1$ in the drawings is grasped by the needle when it begins to draw through the devices attached to the slide 87, the amount of string required for tying one article. The needle and its operating mechanism will be described hereinafter.

The tensioning device comprises a standard 143, secured to the slide 87, and having a pivot pin 144 in its upper part, on which is pivoted a tensioning member 145. The lower part of this member is bifurcated and each arm has a hole 146 therein, to allow the string to pass through.

Mounted at the lower part of the standard 143, is a clamp or friction mechanism 147, which holds the string, but holds it only tightly enough so that when the needle grasps said string, it will pull it through said mechanism 147. The mechanism 147 consists of fixed jaw 148, in which is pivoted at 149 a movable jaw 150. These two jaws provide a restricted V shaped opening 151, for the string. A spring 152, between the jaws 148 and 150, normally tends to restrict the opening 151 and to hold the string until the pull of the needle is sufficient to move it. This mechanism is shown particularly in Figures 16, 24, and 25. As shown in Fig. 24, the string passes from the fixed eye 131, through the hole 146 in one arm of the bifurcated member 145, thence through the opening 151 and through the hole 146, in the other arm of the bifurcated member. The string then passes through another fixed eye 141, and thence to the cutting mechanism 142.

A light spring 153, one end of which is secured to the pivot pin 144 and the other end to the standard 143, forces the member 145 downward, or in the direction of the arrow 154. Secured to the tail 155 of the member 145, is a stronger spring 156, the other end of which is secured to one arm 157 of a bell crank lever, pivoted on the stud 109. The other arm 158 of the bell crank lever comes in contact at the proper time with a pin 159, secured to another slide 160. Thus the member 145 will be forced in the direction opposite to the arrow 154 and working in conjunction with the mechanism 147, will take the slack out of the string, particularly that part, as explained before, of the string between the mechanism 147, and the cutting and holding mechanism 142. The mechanism 142 will be described hereinafter.

As explained before, the slide 87 is operated from the stud 115, which passes downward through the bed plate and has attached to its lower end a short lever 161, which has a slot 162, in which is pivoted at 163 the end of a rod 164. The rod has attached to its opposite end a slotted member 165, which embraces the shaft 40 and carries a cam roller 166, which in turn engages the cam groove in the face cam 167, secured to the shaft 40. The disc 168, secured to the shaft 40, keeps the member 165 in position.

Attention is now directed to the slide 160, which carries the looping mechanism and part of the knot tightening mechanism. This slide is reciprocated by suitable mechanism in a slot 169 in the bed plate. The slide has a top plate 160 and bottom plate 170, both secured to the block 171. The lower plate is held in guides 172, which are screwed or otherwise secured to the bed plate. This lower slide or plate 170 carries the operating mechanism for some of the parts carried on the upper slide or plate 160.

The upper plate 160, as previously mentioned, carries the pin 159, which at the proper time operates the tension device 140. Adjacent the pin 159, and secured to the plate 164, is a lug or projection 173, which engages at the proper time with an adjustable screw 174 on the tail 175 of a string depressing lever 176. The string is caught under the shoulder 177 on the inner or free end of the lever 176. As the slide is moved inward the stop 173 leaves the screw 174, and the lever will be pulled down by the spring 178. The lever is pivoted at 179 to the bracket 88.

Before the slide 160 commences to move, the needle 180 is brought over and takes hold as previously mentioned of that part of the string designated $a^1$. The needle and its operating mechanism will now be described.

The part designated as the needle is made of two pieces, the outer piece 181, being substantially U shaped and embracing the inner or slidable piece 182. The front part of the needle, as shown in Figs. 30 and 31, is cut down to enable it to pass under the spokes 7 of the carrier 8 and the spring depressing lever 176. The inner slidable piece 182 is provided at its forward or gripping end with a head 183, which has a curved contour, to allow it to slip under the string easily. As it is brought up to the string, suitable mechanism projects said head 183, on the inner piece forward, and the string slides into the gap between the end of the outer piece 181 and the head 183 of the inner piece, as seen in Fig. 31. This gap is then closed and the string is thus firmly grasped by the end of the needle. After the string has been looped, and prior to tightening the knot, the string is released from the needle.

The end of the needle opposite the gripping end is carried on a stud 184, which is swiveled on a lever 185, which in turn is pivoted at 186 to a bracket, secured to the bed plate. This lever 185 carries a roller 187, which engages the groove 188 in the drum cam 189, which is secured to the shaft 40. As the shaft 40 rotates, the roller 187 working in the cam groove 188 moves the lever 185 back and forth. The lever 185 having the stud 184, which carries the needle, swiveled to it, thus causes the needle to be reciprocated.

The inner part of the needle has a pin 190, projecting through slots 191 in the outer part. A pair of springs 192 are fastened to the ends of the pin 190 and the other ends of the springs are secured to the outer part of the needle. These springs hold the head 183 tightly against the end of the outer member of the needle, to grip the string firmly.

Pivoted at 193 on a projection of the stud 184, is a member 194, one end of which bears against the end of the inner slidable part of the needle. A light spring 195 keeps it in contact. The tail piece of this member 194, is brought in the path of an adjustable movable stop 196, passing through a slot 197 in the bed plate. The contact between the stop and tail piece is timed to make the gripping end of the needle grasp and let go of the string at the proper time. The needle operating mechanism works in a large curved slot 198 in the bed plate.

The stop 196 is carried on an arm 199 which is pivoted at 200 to a bracket 201, secured to the under side of the bed plate (Fig. 6). The arm 199 carries at its lower extremity a roller 202, which engages cams 203 mounted on the disc 204, which is secured to the shaft 40. These cams move the stop into engagement with the tail piece of the member 194, and thus open and close the needle, at the proper time. A spring 205, keeps the roller 202 in contact with the disc and cams.

Suitable mechanism for guiding the needle is provided and will now be described. On the intermediate part of the needle, somewhat nearer the gripping end, is secured a yoke 206, which has mounted on its lower part a roller 207. This roller is guided in a cam groove that may be formed in the bed plate, or by a cut out plate 208, secured to the bed plate. Different parts of this cam groove or path are designated by the numerals 209, 210, and 211. A switch cam or member 212 is mounted in such a position as to partially close either the passage 209 or 211.

It is the object of these cam grooves which control the movement of the needle, to give the gripping end of the needle an orbital movement. This is desirable and important, in order to insure the gathering together of the cloth or wrapper, preparatory to tightening the knot. The string is guided up to the neck of the package by guides 13$^a$ which are adjacent to each holder.

As shown in Fig. 1, the path 211 is partially closed and the roller 207 will on its first movement slide in the path 209. This guides the needle to the proper location, where it takes hold of the string. The string is grasped and the needle is then pulled back by the mechanism heretofore described, and is carried back in the groove 210. While in this position, the string is being brought under the looping members, which will be described hereinafter. Prior to the roller leaving the groove 210, the switch cam 130

212, is oscillated by suitable mechanism and the groove 209, is practically closed, thus forcing the roller 207, to pass into and along the groove 211. The needle is guided in this groove so that it carries the string around the article to be tied, and through the loops which have been formed. Other suitable mechanism tightens the knot.

The switch cam 212 is mounted on the upper end of a stud 213, which has secured to its lower part a short lever 214. This short lever has pivoted to it at the opposite end 215 a push bar 216, which has a slotted connection 217 with a member 218, pivoted at 219 on the bracket 201. The lower part of this member 218 is segmental and engages, at certain times, a pin 220, secured to the disc 204. A spring 221 is confined between the upper part of the member 218, and a block secured to the bed plate. The pin 220, bearing against the segmental part of the member 218, causes the bar 216 to move in one direction, and the spring 221 returns it to the original position. Thus as the pin 220 slides off the segmental part of the member 218, or is engaged by it, the lever 214 is operated, which in turn moves the switch cams 212.

Referring again to the slide 160, a pair of hooks or loopers 222 are mounted therein, so that they may be turned but not moved vertically. Attached to the lower end of the loopers, are pinions 223 in mesh with each other. One of the pinions 223 is engaged by a rack 224, which is slidably mounted in guides 226, secured to the plate 170. As the entire slide is moved inward by its operating mechanism, the loopers and rack and pinions are moved inward, and the end of the rack comes against a stop 227. Due to the slide continuing to move and the rack being stopped, the rack rotates the pinions which in turn rotate the loopers. When they have been rotated a suitable amount (about three quarters of a revolution) the stop is withdrawn and the spring 228, one end of which is secured to a pin on the rack and the other end to one of the guides 226, pulls the rack back to its original position and thus returns the loopers to their original position.

The mechanism for withdrawing at the proper time, the stop 227 consists of a lever 229, which is mounted at 230 to a bracket, secured to the underneath part of the bed plate (Fig. 23). This lever 229 carries a roller 231, which engages at the proper time a cam groove 232 in the disc 233, which is secured to the shaft 40. The outer end of the lever 229 is engaged by a spring pressed plunger 234, to keep the roller 231 in contact with the edge of the disc 233, and to insure the roller being pushed into the groove 232.

The means for reciprocating the slide 160 will now be described. Secured to the lower plate 170 is a bracket 235, which has pivoted at 236 an arm 237. This arm bears a slotted member 238 at its opposite end which, is engaged by the shaft 40, and the outer extremity of the member 238 carries a cam roller 239 which engages the cam groove 240, of the face cam 241. This cam 241 is secured to the shaft 40 and is so timed as to move the slide 160 back and forth, in its proper relation to the other parts of the machine.

Adjacent the loopers 222, is mounted a block 242, which carries three pins 243 and a guide 244, which are used in conjunction with the hooks or loopers 222, to form the necessary loops in the string. This block has a vertical movement only, in relation to the slide 160, and is secured by a set screw 245 to its operating rod 246. The upper end of this rod is guided by a bracket 247, which is mounted on the slide 160. The lower end is provided with a collar 248 and a spring 249, between said collar and the bottom plate 170. This spring 249 normally tends to pull the block down and keep the end of the rod in contact with the outer end of a lever 250, which is pivoted at 251, in the bracket 235. This lever 250 carries a cam roller 252, which is engaged by a cam face 253, formed in a bracket 254, secured to the bed plate. Another vertical rod 255 is provided, to guide the block 242, and prevent it from turning.

Thus, as the cam 241 operates the slide, and the loopers through their mechanism are rotated, the cam lever 250 and cam 253, by means of the mechanism just described, are raising and lowering the block 242, which carries the other parts of the looping mechanism.

While this mechanism is being operated, a presser foot 256 is being utilized, to hold the article to be wrapped and tied firmly in position. Of course, the holders 13 prevent any horizontal movement and the presser foot eliminates any tendency of the article to a vertical movement. The presser foot is pivoted in a bracket 257 secured to the bed plate, and has a long tail piece 258, which carries at its outer end a cam roller 259, for engaging the cam 260, secured to the shaft 29.

A spring 261, secured at one end to a pin 262, mounted in the presser foot and at its other end to a pin or stud, mounted in the bracket 257, holds the cam roller 259 against the cam 260, when the roller is on the dwell portion of the cam as shown in Fig. 15. As the roller leaves this position, the presser foot comes in contact with its article and the spring 261 holds it there, preventing any upward movement of the article.

The main function of the presser foot is to act as a centering device around which the wrapper is gathered and the knot formed. As the wrapper is generally made of a thin or flimsy material, a device of this kind is essential. The presser foot is tapered, so as to be easily disengaged, just prior to the tying of the knot.

After the needle has grasped the string, and has been given its orbital movement around the wrapper and the article to be tied, and after the loops and knot have been formed (as shown in Figs. 37 to 46 which will be described more fully hereafter) the knot is tightened by a certain mechanism provided for the purpose. Just prior to the operation of the knot tightening mechanism, the needle carries the string to a clamping mechanism. It will be recalled that the other part of the string, coming from the supply, is held by the gripping device 90, mounted on the slide 87. The free end $a^1$, which has been carried by the needle, is guided to and held by another gripping device 263, after which the needle is released and starts back, preparatory to grasping a new piece of string.

The gripping device 263 is mounted in the bed plate and consists of a hollow standard 264, in which is mounted the plunger 234, which is normally held down against the lever 229 by a spring 265. This mechanism (Fig. 23) has been previously described, in relation to moving the stop 227 out of engagement with the rack 224. As the cam roller 231 enters the groove 232, the spring 265 forces the lever 229 downward, carrying the stop 227 out of engagement with the rack and also forces the head 266 against the top of the standard, binding the string in the curved groove 267.

The head 266 and the upper part of the standard 264 are slabbed off as shown, and the needle near the gripping end is provided with a hump, or protuberance, 268. This hump, or protuberance, 268 allows the string to be spaced away from the needle and the gripping device 263 is, therefore, able to take a more positive and firmer grip on the string. The needle presents the string to the slabbed-off part of the standard and head 266 of the gripping device, and due to this slabbed-off part it is enabled to grab more of the string and thus hold it more firmly.

The knot tied by the mechanism is a reef or square knot and has two distinct loops, which are shown particularly in Figs. 45 to 51. The tightening mechanism shown in Fig. 46, runs up and tightens one of these loops and then other parts of the mechanism tighten the other loop. Part of the mechanism for running up and tightening the first loop is carried on the slide 160 and works in conjunction with a stationary cam mechanism 269, pivoted for adjustment on a stud 270, in the bed plate.

A hooked lever 271 is pivoted at 272 to a yoke secured to the slide 160. Pivoted at 273, to the hooked lever 271, is a link 274, which has a pin and slot connections 275 with a bell crank lever 276. This bell crank lever is pivoted at 277 on a post 278, which is secured to an extension of the slide 160, or to a plate fastened thereto. The part of the post 278 above the bell crank lever has a spring 279 coiled around it, which will keep the leg of the bell crank lever, adjacent the horizontal cam edge 280, against said cam 280, as the slide 160 is moved inwards. As the slide 160 is moved inward from the position shown in Fig. 1, the leg of the bell-crank lever 276 is urged toward the cam surface 280, and as it continues to move it is engaged by this sloping cam edge 280 and the link 274, through the medium of the spring 281, is forcing the hooked lever 271 in the right direction to run up and tighten the first loop of the knot. Another hooked lever 282 carried on a slide 283 is at the same time forcing the string of the first loop in another direction. The operation of the lever 282 will be described hereinafter.

As the arm of the bell crank lever 276 is guided along the cam edge 280, a pin 284 mounted in a counterbored post 285 (see Figs. 1, 27 and 29), secured to the arm of the bell crank lever 276, is riding on the sloped surface 286 of the cam 269. When the pin 284 reaches the edge 287 it drops off and, as the slide 160 is then moving back to its original position, the pin rides along the edge 287. As we come to the sudden rise 288 on the cam edge, the hooked lever 271 gives the first loop of the knot a sharp final tightening pull. At the same time, the other hooked lever, is given by suitable mechanism, a sudden movement for the same purpose. The spring 279 returns the bell crank lever and its parts back to normal position, a stop pin 289 limiting the movement of said bell crank lever.

The stationary cam 269 is provided with two adjustments. It may be swung on its pivot 270, and held in place by bolts in the arcuate slots 290. The object of this adjustment is to move the position of the part 288 of the cam, and thus give more force to the final pull on the first loop of the knot. The other adjustment is taken care of by rotating the knurled handle of a threaded stud 291, which is swiveled in the slide 292 carrying the cams, and threaded in a flange 293, on the fixed part. A lock nut 294 holds it in position, when located. The object of this adjustment is properly to time the action of the parts operated by the cam and to compensate for wear of parts.

The operation of the hooked lever 282 and slide 283, previously mentioned, will now be described. The slide 283 is the upper one of a pair of slides that are mounted in the bracket 295. (Figs. 17, 18, 19, 26 and 27). Said slide 283 is reciprocated by an arm 296, which forms the third arm of the member 117, through the medium of the link 297, pivoted at 298, to an extension of the slide 283. This member 117, as previously described, is operated by suitable mechanism from the cam 167 secured to the shaft 40.

The hooked lever 282 is pivoted at 299, in a bracket 300, which is riveted or otherwise secured to the slide 283. A set screw 301, mounted in a shoulder of the bracket 300, limits the movement of the lever 282 in one direction. The tail, or the end opposite the hook, has secured to it a spring 302, the other end of which is fastened to a stud 303, which is riveted to the upper slide. This stud is slabbed off as shown in Fig. 18 and fits in a slot 304 of the member 305, the slabbed off part of the stud 303 preventing any turning of the member 305. The member 305 has secured to it a spring 306, the opposite end of which is secured to an adjustable connection on the post 307, which is fastened to the lower slide 308.

As the slides are moved in the direction of the arrow 309, Fig. 18, both slides will move, but the lower slide, which has a downward extension 310, will butt against a stop 311, carried on the slide 160, while the upper slide will continue to move in the direction of the arrow 309. The spring 306 will thus be tensioned.

Pivoted at 312, on the hooked lever 282, is a link 313, which is pivoted at its opposite end to a pawl 314, pivotally mounted at 315 on the slide 283. As the slide 283 is moved in the direction of the arrow 309, the hooked lever 282 picks up the string and begins to run up or tighten the first loop, working in conjunction with the hooked lever 271.

Mounted in an extension of the bracket 295, is a short adjustable slide 316, on which is pivoted at 317, a stop 318, having a tail piece 319. A spring 320, one end of which is screwed to the tail piece and the other end to a pin on the slide, holds the movable stop 318 against a fixed stop 321. This movable stop 318 has the same function as the rise 288, on the cam edge 287, that is to give to the first loop of the knot a final tightening pull. Both work simultaneously.

The tensioning of the string after it has been picked up by the lever 282, through the medium of the link 313, makes the pawl 314 assume a position practically at right angles to the slide 283. As the pawl 314 comes in contact with the stop 318, it gives the hooked lever 282 a sharp quick movement in the proper direction, to give the final tightening pull on the string for the first loop and the pawl 314 then moves past the stop 318. In moving back to its starting position, the pawl 314 forces the stop 318 out of the way and the spring 320 brings it back to its operating position.

The slide 316 has a lug 322, extending down through the extension of the bracket 295. A threaded stud 323 is held against longitudinal movement in this lug by a pair of collars, and said stud 323 is threaded in an extension 324 of the slide 316. A knurled head is provided on the stud 323 for turning it, and a lock nut 325 holds it in position. This provides the adjustment means for the stop 318, so as to time it properly with the rise 288, on the cam edge 287, and with other movements on the machine.

After the first loop has been tightened, the downward extension 310, on the lower slide 308, tightens the second loop. This is accomplished by virtue of the stop 311, on the slide 160, being moved out of the way as the slide 160 is reciprocated. This stop 311 holds the lower slide, until the upper slide has made its maximum movement and stretched the spring 306. The stop 311 then being moved out of engagement with the extension 310, the spring 306 forces said extension against the second loop and runs it up and tightens it. This is shown particularly in Fig. 46.

When the second loop is being tightened, both hooked levers 271 and 282 are moved out of engagement with the first loop. The string is being held by the gripping devices 90, and 263, and the tensioning device carried by the curved arm 114 is helping to tighten both loops of the knot.

After both loops have been tightened and the knot formed, the cutting mechanism designated generally as 142 is operated to cut the string. This cutting mechanism cut the string holds the loose end after cutting the string between it and the tension device 140, so as to provide the part $a^1$ of the string that is to be grasped by the needle for the next operation, as previously described.

The operation of this cutting and holding mechanism will now be described. The mechanism is carried on the slide 87, which carries the tensioning devices. A bar 326, with a cut out part 415, fits on the slide 87, and is held thereto by a screw 327. Screws 328 hold a plate 329 on the bar 326, said screws 328 being arranged so as to allow a slight vertical movement of the plate 329. This plate has, at one end, a narrowed down and bent up portion 330. A fixed blade 331 fits in and is held in the cut out part of the bar 326. Adjacent to this fixed blade is a movable blade 332, which has a slot 333, with studs 334 passing through said slot. A retaining plate 335 fits against the movable blade 332. The studs 334, one of which has a spring 336 between its head and the retaining plate, hold the parts in contact and allow the movable blade to be easily reciprocated.

The movable blade is reciprocated by means of a bell crank lever 337, pivoted at 338 to an arm 416, either secured to or integral with the slide 87. One arm of the bell crank lever works in a notch 339, in the movable blade 332. The other arm of the bell crank lever is pivoted to a rod 340, which is mounted in an extension 341 of the bracket 295. This rod has a head at its outer end, and between said head and the extension 341 is a spring 342, which normally tends to keep the cutting mechanism in the position shown in Figs. 18 and 20.

When the slide 87 is moved outward, the rod 340 causes the bell crank lever 337 to operate the cutting mechanism, to cut and hold the string, and the parts assume the position shown in Figs. 19 and 21.

The movable blade is provided with a cam edge 343, which co-operates, when the mechanism is functioning, with a cam edge 344 on a plate 345. This plate 345 is yieldingly held to the plate 329, by screws and springs 346. The opposite end of the movable blade has a rounded nose 347, adjacent to the cutting edge 348, and a light spring 349 is located along side of the cut out part 350. When the mechanism is being operated, the string rides under the part 330 of the plate 329. When the movable blade is brought to the position shown in Fig. 21, the string rides up on the nose 347 and into the cut out part 350, against the cutting edge 348. The spring 349 prevents the string from getting out of the pocket 350. As the movable blade is then moved to the position shown in Fig. 20, the cutting edges of both blades have passed and the string has been cut. The end of the string attached to the wrapped package is free, but it is necessary to hold the end coming from the source of supply, to provide the part $a^1$ of the string previously mentioned.

Due to the amount of play between the plate 329 and the bar 326, the string readily slides between these two members and, after the string has been cut and is between these two members, the co-operating cam edges 343 on the movable blade, and 344 on the plate 345, force the plate 329, tightly against the bar 326 and the string is held there, until pulled away by the needle.

After the article has been wrapped and tied, suitable mechanism is provided to eject it from the holder on the carrier. This mechanism consists of a U shaped bar 351. The shorter leg of said bar ejects the article and for this purpose, as previously mentioned, a segment of the supporting ring 9 has been cut away. The longer leg of the bar bears against the cam 260, which also controls the presser foot. The ejector is guided in a bracket 352, which is secured to the bed plate, and a keyway 353 is formed on the longer leg of the ejector. A pin 354 acts as key, to work in the keyway 353 and prevent the ejector from turning. A spring 355, one end of which is attached to a lug in the extension 352 and the other end to a pin on the bar, keeps the ejector in contact with the cam. When the longer leg of the ejector is on the low part of the cam, the shorter leg is forcing the article from the holder. A chute 356 is secured to the bed plate, on which the articles drop and are guided to a suitable container.

As previously explained, the shaft 40 is revolved by suitable sprocket and sprocket wheels from the shaft 29. This shaft in turn is rotated by a set of gearing 357, from the sleeve 358, mounted on the fixed stud 359.

This fixed stud 359, is secured in the leg 2, and the sleeve 358 has pinned to its outer end a hand wheel 360, for manipulating the machine by hand when it is necessary to make any adjustments, or for any other reason. A loose pulley 361 is mounted next on the sleeve, and adjacent to the loose pulley is a tight pulley 362, which is the main driving pulley and is secured to the sleeve. The pinion 363 is secured to the sleeve, between the fixed pulley and the shoulder on the stud 359. A collar 364, pinned to the stud, keeps in position the sleeve and the parts mounted thereon.

The set of gearing 357 has distinct novel features. The pinion 363, which is secured to the sleeve 358, has on its front part a set of teeth 365 (Fig. 34), and a blank space 366. On its rear part, there is a set of teeth 367 and a blank space 368. Certain teeth 369 are common to both front and rear parts of the pinion.

The gear has on its front half a cut out part 370, in which the segment 371 can work back and forth, the segment being loosely mounted on the shaft 29. The remaining part of this half is provided with teeth 372. The front half is bolted or otherwise held to the rear half at 373. The rear half of the gear is provided with teeth 374, and a blank space 375.

As shown in Figs. 32 and 33, the machine is ready to start a cycle. The teeth 365 engage the teeth 372 and are rotated in the direction of the arrows, and the blank space 368 is passing by the teeth 374. The common teeth 369 engage the teeth on the gears and the teeth 367 engage the teeth 374. It is thus seen that the shaft 29 is rotated until the edge 376 of the segment comes up to the pinion. At this time the beginning of the blank part 375 on the gear 359 is approaching the pinion. Therefore, it will be seen that the teeth 365 on the pinion will engage the teeth 377 on the segment and the segment will ride in the cut out part 370 but will impart no movement to the machine until the edge 376 comes in contact with the edge 378 of the cut out part. By that time the end of the blank space 375 has been reached and the teeth on the pinion will be engaged by the teeth 374, on the gear.

This momentary stopping of the mechanism comes just after the first loop of the knot has been drawn tight. This is when the knot would be in the position shown in Fig. 50. The rise 288 on the cam surfaces 287 causes the hooked lever 271 to give a sharp tightening pull on the first loop of the knot, simultaneously with the pawl 314 coming in contact with the stop 318, giving the hooked lever 282 a similar sharp tightening pull. This runs the first loop up and tightens it.

However, it has been found, particularly in dealing with a wrapper that is stiff, that before the second loop could be run up and the knot finally tightened, the stiff wrapper naturally tending to open would loosen the first loop so that although the knot were perfectly tied it could very readily be slipped off the package. In dealing with muslin or a wrapper of a very soft nature this gearing could very well be eliminated and a continuous drive used.

The mechanism only stops a fraction of a second and the parts are so timed, as previously explained, that this final tug on the first loop holds the string tight around the gathered neck of the package until the second loop is tightened and the knot completed.

The isolated tooth 379 on the segment maintains the relation between the gear and pinion, in case the machine should be turned backwards at any time.

Means are provided for preventing any back lash, or backward movement, of the machine during the interim of rest. A disc 380 is fixed to the end of the shaft 29, and a pawl 381 is mounted on the leg 2. This pawl engages a notch 382 in the disc, at the time when the machine is stopped, and thus prevents any backward movement.

As previously explained, a mechanism is provided for stopping the machine, in case the string breaks or becomes tangled prior to entering the machine. It has been shown how if the string should break the slide 134, would come in contact with the vertical slide 135, and force said vertical slide 135 downward thus operating the stop mechanism. The stop mechanism would also be operated, if a knot or tangled part of the string came up to the eye 84 in the member 85, as shown in in Fig. 14. This mechanism will now be described.

Mounted in a bracket 383, secured to the bed plate, is a pin 384, having a spring 385 encircling it. One end of the spring is secured to the pin and the other end to the bracket, and the spring is wound, to force the handle 386, which is secured to the pin, upwards. A hub 387, provided with a flange, is secured to the opposite end of the pin 384, and the flange has a notch 388 cut on its periphery.

The member 85 is pivoted at 389, in a yoke 390 secured to the bracket 383, and is provided at its inner end with a tooth 391, adapted to engage the notch 388, and a toe or projection 392, upon which the vertical slide 135, rests when the machine is in operation. The vertical slide 135 works in a groove cut in the bracket 383, and is held in place by a plate 393, screwed to the bracket 383. A screw 394, mounted in the bracket 383, acts as a stop, to prevent the handle 386 from being raised too high when the tooth 391, is released from its notch 388.

Pivoted on the handle 386, at 395, is a link 396, which has, near its lower end a slot 397, in which is located the headed screw 398, which is threaded into the lever 399. The lever 399 is pivoted at 400, to an extension 401 from the slide 402, which is mounted by pin and slot connections 403, to the legs 2 and 3. The opposite end of the lever 399 is pivoted at 404 to a short lever 405, which is in turn pivoted at 406, to an extension 407, secured to the leg 2 of the machine. The levers 399 and 405 form a toggle joint and, in order to prevent it going past dead centre on its downward movement, a stop pin 408 is provided.

A spring 409, one end of which is attached to the lower end of the link 396, and the other end of which is attached to a pin on the lever 399, is used to keep the levers 399 and 405 in position, and prevent them from rising or breaking the toggle joint, when the machine is in the operating position as shown in Fig. 9.

The slide 402 has a bifurcated end 410, which moves the belt shifting lever from the working position of Fig. 9, to the loose pulley, or to a position shown in Fig. 2. The belt shifting lever is pivoted at 411 to a bracket 412, secured to the leg 2 of the machine. The large spring 413, one end of which is attached to the leg 2 and the other end to the slide 402, moves the slide over positively, when the toggle joint formed by the levers 399 and 405 has been broken.

The slot 397 in the link 396 allows the belt to be shifted from the tight to the loose pulley or vice versa without interfering with the mechanism mounted on the bracket 383.

From the foregoing, it will be clear that when the tooth 391 is disengaged from the notch 388, either by the member 85 being pulled upward, because of a knot in the string, or by the projection 392 being forced downward, by a break in the string, the machine will be immediately stopped by the action of the spring 385 forcing upwards the handle which in turn pulls the link up and, through the mechanism just described operates the belt shifting lever.

A brief description of the operation of the machine will follow, as it is thought the operation has been made fairly clear from the foregoing.

Prior to starting the machine, the string $a$, is threaded through the hole 84 in the member 85, and thence through the tensioning devices on the slide 87, up to the cutting and holding mechanism 142. The string is cut off by the fixed blade and is held in the mechanism 142, thus providing the part $a^1$ of the string that the needle grips.

Considering the machine as in operation, with all the holders containing a piece of blue $b$, and a cloth covering $c$, while the machine is in the position shown in Fig. 1, the operator would be laying a piece of cloth in the pan 15 and forcing a piece of blue with the covering into the holder 13, under the pan. At the same time the needle, looping, tensioning and tightening mechanisms would be operating to tie up the piece of blue adjacent to these mechanisms and the ejecting device would be forcing a piece of blue properly wrapped and tied from the holder at the next station, thus leaving an empty holder to come to the filling station on the next cycle of the operation.

As had been explained by means of the mechanism particularly shown in Figs. 3, 4, 5, 10 and 11, while the wheel is being turned, the needle, looping, tensioning and tightening mechanism is not being operated, but just as the pin 73 engages one of the notches 74 in the carrier 8, this set of mechanisms commences to function.

Figs. 37 to 46 show particularly the operation of the looping and knot tightening mechanism. Starting at Fig. 37, the cloth $c$, and the blue $b$, is shown in position as it arrives at the station where it is tied. The needle has just been brought over by its operating mechanism and is about to grip the part of the string designated $a^1$. None of the other parts have as yet been moved.

Passing to Fig. 38, it will be noted that the needle has grasped the thread and drawn it under the projection on the string depressing lever 176, and over the guide 244 and the pins 243. The slide 160 then commences to move inward, and the string depressing lever 176 forces the string down, so as to insure it going under the hooks of the loopers 222.

Fig. 39 shows the slide moved inward a little more, with the string under the hooks of the loopers 222 and over the pins 243 and the guide 244. In this view, the needle has moved over more and is starting to bring the string against a guide 13ª, which runs from the bottom of the holder 13 to the top, where it is curved to guide the string to the proper starting place, to gather in the cloth. As the slide 160, starts to move inward, the block 242, carrying the pins 243 and guide 244, starts to move upwards under the control of its actuating mechanism previously described.

Fig. 40 shows the slide 160 moved further inward, with the string being lifted upward by the pins 243, and guide 244, against the guide 13ª, but still held under the hooks of the loopers 222. The string has left the depressing lever 176 and is now being brought under the raised end 330 of the plate 329, on the cutting and holding mechanism 142.

Fig. 41 shows the slide 160, moved still further. The string has been slid over the curved top of the guide 414 and is starting to gather in the cloth $c$, preparatory to getting it in a position to be tied. The block 242, carrying the pins and guides, has been raised higher and the loopers 222 have started to revolve. The string is now approaching the hooked lever 271 mounted on the slide 160. The presser foot 256 has been brought down on the blue by its actuating mechanism, and prevents any tendency of the blue to be raised while being tied. The presser foot acts as a centering device, around which the cloth is gathered and the loops for the knot are formed, and is not removed until the first loop of the knot is tightened.

Fig. 42 shows a further movement of the parts. The loopers have turned, so as to start forming the loops, $x^2$ and the wrapper has been gathered in a little more. The block 242, carrying the pins 243 and the guide 244, has been raised to its limit and the presser foot is still in contact with the blue.

In Fig. 43, the parts have been still further advanced. The loopers 222 have been turned as far as they can go, which is about three quarters of a revolution, and the loops $a^2$ are formed on said loopers, while the hooked tightening levers 271 and 282 are almost in a position to take hold of the string. In this view, the needle is shown in a broken line position, which it assumes preparatory to the position shown in Fig. 44. The position as shown by the broken lines in Fig. 44 corresponds to the view of Fig. 47. In Fig. 47 the position is somewhat distorted, for clearness of illustration.

In Fig. 44, the needle is shown after it has carried the string through the two loops $a^2$ and to the gripping device 263, which has grasped the string. The cloth has been entirely gathered up and the hooked levers 271 and 282 are approaching the position they take, when they tighten the first loop. In this Figure the loopers are just ready to return to their normal position and disengage themselves from the loops $a^2$ which have been formed.

Fig. 45, shows the position after the needle has released the string and been drawn back through the loops $a^2$. At this time, the slide 87, carrying the tensioning mechanism, is starting to move out and the gripping device 90, on the end of the slide 87, has grasped the string. The curved lever 114, carrying the two studs 104 and 107, is starting to move away from the slide and the hooked lever 282 is working past the guide 244 as the slide 283, carrying the said hooked lever, starts to move inward and the slide 160, carrying the guide 244, starts to move outward. The position of the string in Fig. 45 corresponds approximately to the position shown in Fig. 48, that is the two loops have been formed and the end of the string is passed through them.

Figure 48:
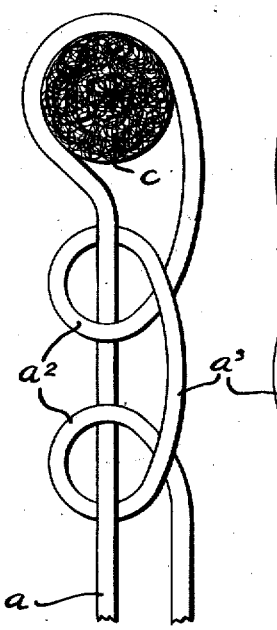
Figure 49:
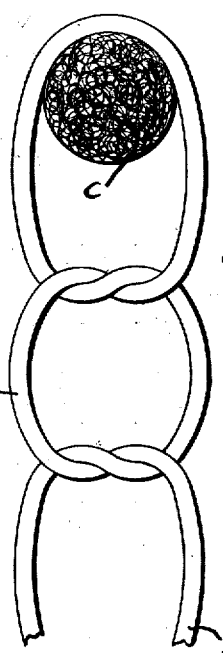

The hooked lever lifts that part of the string designated $a^3$ which is between the two loops and shifts it, approximately from the position shown in Fig. 48 to that shown in Fig. 49, or 46, thus placing it in position so that the first loop or knot may be run up and tightened and then the second may be formed.

Fig. 46, shows the two hooked levers as they start to run up and tighten the first loop of the knot. From this view, it will be plainly seen that, after the first loop has been tightened, the downward extension 310 on the lower slide is moved inward, running up and tightening the second loop and completing the knot. The movement of the curved lever away from the slide 87 also puts a very strong tension on the string and performs the larger part of the work of actually tightening the knot.

Figure 50:
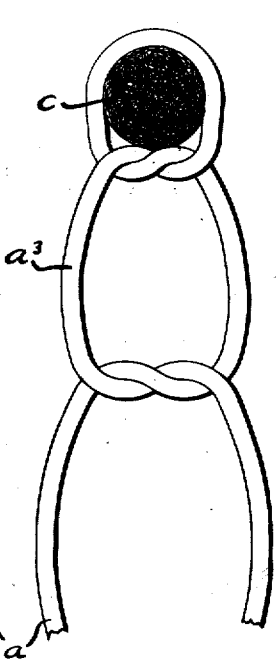
Figure 51:
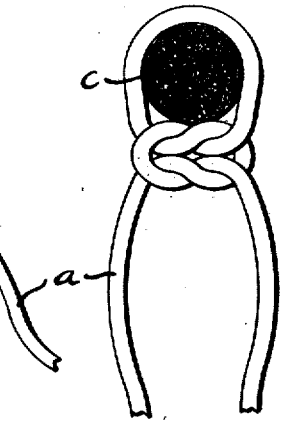

The position of the string, as shown in Fig. 46, would correspond to that shown in Fig. 49. While the first loop is being tightened, the presser foot leaves the blue and the cloth is drawn tightly together, as shown in Fig. 50. The hooked levers 271 and 282 then pass out of engagement with the string and the downward extension 310, as the slide 308 runs up and tightens the second loop, giving the finished knot as shown in Fig. 51.

Figure 52:
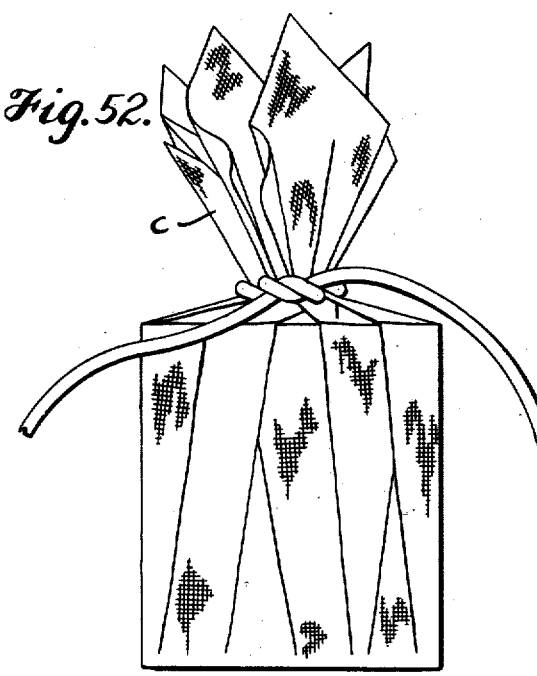
Fig. 52 is an elevation, showing the final result after the machine has wrapped and tied the article, cut the string, and ejected it from the machine.

Fig. 52, shows the completely wrapped and tied package.

After the knot has been tied the gripping devices 90 and 263 are released, and the parts are restored to their original position for the next cycle.

The operation of the ejecting mechanism and the mechanism for stopping the machine, in case there is no blue in the holder or the string breaks, has been described.

From the foregoing description, it is evident that numerous changes may be made in the machine, without departing from the scope of the claims.

What I claim and desire to secure by Letters Patent is the following:

1. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, gripping means for the free end of a string, means for giving said gripping means an orbital movement about the end of the partially wrapped package to gather in the wrapper and complete the wrapping and means for tying the string about the open end of the wrapper.

2. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, a needle provided with a gripping jaw for the free end of a string, means for giving said needle an orbital movement about the end of the partially wrapped package so that the string will gather in the wrapper and complete the wrapping of the article, and means for tying the string about the open end of the wrapper.

3. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, a needle provided with a sliding gripping jaw to grasp the free end of a string, means for operating said jaw, means for giving the needle an orbital movement about the end of the partially wrapped package so as to gather in the wrapper and complete the wrapping of the article, and means for tying the string about the open end of the wrapper.

4. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, a needle provided with a movable gripping jaw to grasp the free end of a string, a lever for actuating said jaw, a stop to actuate said lever, means for giving the needle an orbital movement about the end of the partially wrapped package so as to gather in the wrapper and complete the wrapping of the article, and means for tying the string about the open end of the wrapper.

5. In a wrapping and tying mechanism the combination of means whereby an article is associated with the central portion of a flat wrapper and the wrapper turned about the sides of said article leaving the wrapper open at one end, an intermittently rotated carrier, a series of holders on the carrier, means for stopping the machine if a holder is empty or carries an imperfect package, and means for tying a string about the open end of the wrapper.

6. In a wrapping and tying mechanism the combination of means whereby an article is associated with the central portion of a flat wrapper and the wrapper turned about the sides of said article leaving the wrapper open at one end, an intermittently rotated carrier, a series of holders on the carrier, means for stopping the machine if a holder is empty or carries an imperfect package, said means comprising a slide carrying a member adapted to engage openings in the holders and means to operate said slide, and means for tying a string about the open end of the wrapper.

7. In a machine for wrapping and tying sticks of blue, the combination of means whereby the stick of blue is associated with the central portion of a flat wrapper and the wrapper turned about the sides of the stick of blue leaving the wrapper open at one end, a carrier for carrying the partially wrapped packages to a tying station, means for locking the carrier in position after being advanced one step, means for stopping the carrier when there is no blue in one of the holders in said carrier and means for tying a string about the open end of the wrapper.

8. In a machine for wrapping and tying sticks of blue, the combination of means whereby the stick of blue is associated with the central portion of a flat wrapper and the wrapper turned about the sides of the stick of blue leaving the wrapper open at one end, a carrier for carrying the partially wrapped packages to a tying station, means for locking the carrier in position after being advanced one step, said means comprising notches in the carrier, a pin carried on a pivoted lever to engage said notches and means to operate the lever so as to throw said pin in or out of engagement with said notches in the carrier, and means for tying a string about the open end of the wrapper.

9. In a machine for wrapping and tying sticks of blue, the combination of means whereby the stick of blue is associated with the central portion of a flat wrapper and the wrapper turned about the sides of the stick of blue leaving the wrapper open at one end, a carrier for carrying the partially wrapped packages to a tying station, means for rotating said carrier, means for locking said carrier in position after being advanced one step, means for throwing the rotating means for said carrier out of operation and means for tying a knot around the open end of the wrapper.

10. In a wrapping and tying mechanism the combination of means whereby an article is associated with the central portion of a flat wrapper and the wrapper turned about the sides of said article leaving the wrapper open at one end, an intermittently rotated carrier, a series of holders on the carrier, means for stopping the machine if a holder is empty or carries an imperfect package, said means comprising a slide carrying a member adapted to engage openings in the holders and means to operate said slide, said means comprising an extension from said slide to contact with and displace a notched link, the notch in the link engaging a pin with a slabbed off portion and a round portion, the pin being mounted on the lever which operates the intermittent rotary carrier operating means, and said link being pivotally connected to the lever engaging the notch in the sliding key.

11. A wrapping and tying machine having in combination, means whereby an article is associated with the central portion of a flat wrapper and the wrapper turned up about the sides of the article and left open at the end opposite the central portion, a carrier for carrying the partially enveloped package to a tying station, means for tying a string about the open end of the package, and means for cutting the string and holding the end of the string coming from the supply.

12. In a wrapping and tying machine for sticks of blue, the combination of means whereby an article is associated with the central portion of a flat wrapper and the wrapper turned about the sides of the stick of blue leaving the wrapper open at one end, a carrier for carrying the partially wrapped packages to a tying station, a needle having a gripping jaw, means for moving the needle and operating the gripping jaw so as to cause the string to be grasped by the jaw and gather in the wrapper and complete the wrapping of the article and means for tying the string about the open end of the package.

13. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, holders on the carrier for the partially wrapped packages, guides adjacent the holders for guiding the string to the neck of the partially wrapped packages, a needle to grasp the string and cause the string to gather in the wrapper and complete the wrapping of the article and means for tying the string about the open end of the package.

14. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, means for supporting the carrier, means for intermittently rotating the carrier, comprising a ratchet, a pawl carried on a slide, and means for reciprocating said slide, holders on the carrier for holding the partially wrapped packages and means for tying the open end of the packages.

15. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, means for intermittently moving said carrier, means for tying a string about the open end of the partially wrapped packages and means for holding the tying means out of operation while the carrier is being moved.

16. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, means for intermittently moving said carrier, means for tying a string about the open end of the partially wrapped packages and means for holding the tying means out of operation while the carrier is being moved, said means comprising a lever adapted to engage a notch in a sliding key and means for actuating the key so as to lock the tying mechanism or allow same to operate at the proper time.

17. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, two parallel shafts, one shaft carrying means for operating the carrier, means for rotating the shaft, the other shaft carrying means for operating the tying mechanism and means for operating the second shaft from the first.

18. In a wrapping and tying machine, the combination of means whereby an article is associated with the central portion of a flat wrapper and the wrapper turned about the sides of the article leaving the wrapper open at one end, a carrier for carrying the partially wrapped packages to a tying station, means for intermittently moving said carrier, means for tying a string about the open end of the partially wrapped packages, and means for holding the tying means out of operation while the carrier is being moved, said means comprising a pivoted lever, wedge shaped on its free end, a link for operating said lever, a pin mounted near the free end of said lever, said pin and wedge engaging a key carried by and slidably mounted in a shaft, means for pulling the key inward, a driving member loosely mounted on said shaft, provided with slots to engage the end of the key so that when said key is not engaged by said lever the key will slide inward and engage said slots thus driving the shaft.

19. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine.

20. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member and means to operate said slide.

21. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member, a toggle to operate said slide and means to operate said toggle.

22. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member, a toggle to operate said slide, a link to break said toggle and means to operate said link.

23. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member, a toggle to operate said slide, a link to break said toggle, a lever or handle connected by said link to said toggle and means to normally force said lever or handle upwards.

24. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member, a toggle to operate said slide, a link to break said toggle, a lever or handle connected by said link to said toggle, said lever secured to one end of a pin, a spring surrounding said pin and wound to force said lever upwards and means secured to said pin to normally prevent said lever from being forced upward.

25. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine or becomes tangled prior to entering the machine, said means comprising a belt shifting member, a slide to operate said belt shifting member, a toggle to operate said slide, a link to break said toggle, a lever or handle connected by said link to said toggle, said lever secured to one end of a pin, a spring surrounding said pin and wound to force said lever upwards, a notched disc secured to said pin, a pivoted member having a tooth to engage said notch and a hole for the passage of the string in the outer end of said pivoted member.

26. In a wrapping and tying machine, the combination of means whereby an article is associated with the central portion of a flat wrapper and the wrapper turned about the sides of said article leaving the wrapper open at one end, a carrier for carrying the partially wrapped packages to a tying station, means for tying a string about one end of the partially wrapped package and means for stopping the machine if the string breaks in the machine, said means comprising a slide, mounted on the bed plate, said slide having an upward projection, an L shaped lever mounted on a slide parallel to the aforesaid mentioned slide, means on said L shaped lever for engagement with the string so that when the string is broken a downward extension on said L shaped lever will engage said projection on said slide, a vertical slide for engagement with said horizontal slide and a projection on a pivoted member for engagement with said vertical slide.

This specification signed this 30 day of January, A. D., 1922.

WILLIAM RYDER.
EDWARD RYDER.

In the presence of—
RALPH V. M. GORSLINE.